United States Patent
Turbiner et al.

(10) Patent No.: US 12,375,114 B2
(45) Date of Patent: Jul. 29, 2025

(54) RADAR SYSTEM UPGRADE KIT

(71) Applicant: General Radar Corporation, Belmont, CA (US)

(72) Inventors: Dmitry Turbiner, Dallas, TX (US); Jon Williams, San Francisco, CA (US)

(73) Assignee: General Radar Corporation, Belmont, CA (US)

( * ) Notice: Subject to any disclaimer, the term of this patent is extended or adjusted under 35 U.S.C. 154(b) by 344 days.

(21) Appl. No.: 18/308,306

(22) Filed: Apr. 27, 2023

(65) Prior Publication Data

US 2023/0353178 A1 Nov. 2, 2023

Related U.S. Application Data

(60) Provisional application No. 63/365,233, filed on May 24, 2022, provisional application No. 63/365,181, filed on May 23, 2022, provisional application No. 63/363,778, filed on Apr. 28, 2022, provisional application No. 63/335,691, filed on Apr. 27, 2022.

(51) Int. Cl.
*H04B 1/12* (2006.01)
*H04B 1/18* (2006.01)

(52) U.S. Cl.
CPC .............. *H04B 1/126* (2013.01); *H04B 1/18* (2013.01)

(58) Field of Classification Search
CPC .................................. H04B 1/18; H04B 1/126
See application file for complete search history.

(56) References Cited

U.S. PATENT DOCUMENTS

| | | | |
|---|---|---|---|
| 8,212,715 B2 | 7/2012 | Himmelstoss et al. | |
| 8,344,937 B2 | 1/2013 | Drake et al. | |
| 9,983,295 B2 | 5/2018 | Mitchell | |
| 10,302,739 B2 | 5/2019 | Bleyer et al. | |
| 10,908,255 B2 | 2/2021 | Carswell et al. | |
| 12,299,819 B1* | 5/2025 | Bhushan | G01B 11/22 |
| 2011/0032141 A1* | 2/2011 | Elleaume | H01Q 21/0025 342/197 |
| 2023/0266452 A1* | 8/2023 | Sicron | G01S 7/356 342/21 |
| 2023/0353178 A1* | 11/2023 | Turbiner | H04B 1/126 |

* cited by examiner

*Primary Examiner* — Patrick F Marinelli
(74) *Attorney, Agent, or Firm* — Fish & Richardson P.C.

(57) ABSTRACT

A system and rack includes an antenna subsystem having a preexisting processing pipeline that receives radio frequency returns and an upgraded signal processing pipeline that performs detection processing for the antenna subsystem. The upgraded signal processing pipeline couples to the preexisting processing pipeline. The upgraded signal processing pipeline includes sampling converters to sample the radio frequency returns of the antenna subsystem, field-programmable gate array devices to generate detection data of the radio frequency returns at full-bandwidth and full-range of the antenna subsystem, graphics processing units to apply algorithms to the detection data of the radio frequency returns, and a signal processor configured to perform operations on the sampled radio frequency returns. The operations can include sampling returns, down-converting sampled detections, filtering detections, digitizing radio frequency returns, and applying algorithms to generate output data. The output data can be provided to the preexisting processing pipeline of the antenna subsystem.

25 Claims, 9 Drawing Sheets

RADAR SYSTEM UPGRADE KIT

CROSS-REFERENCE TO RELATED APPLICATIONS

This application claims benefit of U.S. Provisional Application No. 63/335,691, filed Apr. 27, 2022, U.S. Provisional Application No. 63/363,778, filed Apr. 28, 2022, U.S. Provisional Application No. 63/365,181, filed May 23, 2022, U.S. Provisional Application No. 63/365,233, filed May 24, 2022, the entireties of which are herein incorporated by reference.

BACKGROUND

In a phased array radar system, the radio signal emitted by each antenna in an array of antennas is phase shifted relative to an adjacent antenna such that the combined wavefronts emitted by the antenna array form a plane wave. By altering the amount of phase shifting applied to each antenna, the propagation direction of the plane wave can be varied. Receiving elements of the radar system operate in the reciprocal manner by applying a different phase shift to each received signal. Beamforming is the process of modifying the phase and/or amplitude of a signal in an antenna array system to achieve a desired spatial directionality for signal transmitted and/or received by the system. Analog beamforming includes varying the amplitude/phase of an analog signal at the transmit end and/or receive end of an antenna array system. Phased array radar systems relying on analog beamforming are used in various applications, including, e.g., military applications to detect objects in the sky, and commercial applications, such as monitoring weather patterns, precipitation, and intensity.

Furthermore, radar systems can include multiple subsystems with hardware and software components that generally cannot be upgraded without updates to all subsystems. These components for the subsystems can also be complex, tailored to specific subsystems of the radar system, and complicated to integrate into an existing hardware system. Radar systems can include a signal processing subsystem (also referred to as a "signal processing pipeline") that include hardware and software components to process detections received by antenna elements of the radar system. The signal processing pipeline of a radar system can apply algorithms to detections to generate output data for the radar system, such as estimated trajectories of objects and classification of object type.

SUMMARY

As the number of antennas grows in phased array radar systems, analog beamforming presents multiple challenges including, e.g., increasing difficulty in controlling synchronization of phase shifting across the transceivers and decreasing control over directionality of beams. Additionally, each analog sub-block of the beamforming system contributes to a reduction in overall data quality. Despite these drawbacks, costs associated with constructing new systems with improved control can, in some implementations, discourage replacing legacy phased array radar systems. Furthermore, upgrades performed at each sub-blocks of the beamforming system can be too costly or complex, as upgrades can have upstream effects on other portions of the radar system. These upstream effects can lead to numerous changes in subsystem requirements, interfaces, data handling routines, and software.

Some approaches to upgrading components or subsystems of a radar system may not be feasible to implement with existing radar hardware, such as installing receiver/exciters at each of the subarrays to provide digital beamforming to the radar system. These approaches often do not provide time synchronization between different receive channels of the existing radar signal processing pipeline to enable digital beamforming. Furthermore, these approaches also typically require substantial and complex changes to legacy radar software across multiple programming hierarchies, such as low-level assembly instructions for antenna hardware to adding libraries and classes to high-level radar software.

In general, innovative aspects of the subject matter described in this specification describe a system that includes an upgraded signal processing pipeline coupled to the preexisting processing pipeline. The upgraded signal processing pipeline is configured to perform detection processing for the antenna subsystem and can include sampling converters, a signal processor, field-programmable gate array devices, and graphics processing units to generate output data for the preexisting signal processing pipeline of the radar system. The upgraded signal processing pipeline can be coupled to the radar system as a radar upgrade kit, and can provide additional capabilities to the radar system such as improved detection processing, digital beamforming techniques, and arbitrary waveform generation.

Particular embodiments of the subject matter described in this specification can be implemented to realize one or more of the following advantages. As described in this specification, the radar upgrade kit provides an upgraded signal processing pipeline for the radar system to leverage for additional processing resources, through the general purpose computing provided by graphics processing units (GPUs), high-speed samplers (e.g., analog-to-digital, digital-to-analog), and field-programmable gate arrays (FPGAs). The radar upgrade kit is customizable at the hardware level, with modular components and interfaces that can be more easily upgraded or exchanged (e.g., compared to highly customized components) to support applications (e.g., weather monitoring, missile defense, air traffic control) performed by the radar system.

The modularity of the components such as the high speed samplers, GPUs, and FGPAs from the radar upgrade kit can provide numerous advantages to a radar system. The modular components can provide multiple channels (e.g., transmit, receive) that continue to operate the radar and maintain radar operability, even if a failure or performance degradation occurs in the pre-existing signal processing pipeline of the radar system. Furthermore, the modularity of the components of the radar upgrade kit facilitate further upgrades of the radar system by replacing the components with additional, modern equipment. The modern equipment can be installed in the radar upgrade kit with minimal impact to the operability of the radar system, by upgrading each channel corresponding to each subarray. By upgrading on a per-channel basis, the radar system can continue to operate with the upgraded signal processing pipeline provided by the radar upgrade kit The radar upgrade kit can also leverage existing waveforms of a radar system, in addition to providing digital beamforming capabilities to provide digitally generated waveforms that are particularly useful in mitigating electromagnetic interference. The radar upgrade kit can provide digital beamforming to a radar system without replacing hardware at the level subarray of the radar system, by leveraging software algorithms and tensor-based computing to perform the process digitally by the upgraded signal processing pipeline. The radar upgrade kit can provide analog-to-digital and/or digital-to-analog channels for each subarray of the radar, by connecting RF cables for each subarray to obtain the receive signals of the RF returns.

Furthermore, the radar upgrade kit provides additional complex signal processing algorithms without making modifications to the existing radar signal processing pipeline hardware and/or software. In other words, the radar upgrade kit can serve as an intermediary system with improved signal processing capability between the antenna array and pre-existing signal processing pipeline of a radar system. Compared to some approaches of adding these complex algorithms to the radar system, the radar upgrade kit can provide these algorithms without adding significant hardware across multiple levels of the radar system. Adding hardware and/or complex algorithms using these approaches can disrupt operational schedules of radar systems, which is highly undesirable as radars provide data for life-saving applications such as missile defense. Any radar downtime is unwanted and prevents the radar system from providing data such as estimated trajectories of detected objects.

With additional processing capability provided by GPUs, the radar upgrade kit can provide improved radar resolution and detectable range. The additional processing ability of the GPUs, compared to the existing memory and central processing units used in radar systems, provides reduced traffic and improved computational efficiency. For example, more expensive actions that utilize multiple operational cycles of the radar system can include scheduling waveforms with long pulse repetition frequencies that are conventionally difficult to schedule. The GPUs provide that these expensive waveforms can be generated, commanded, and processed while the pre-existing signal processing pipeline of the radar system performs nominal operations such as searching and tracking other objects. As another example, mitigating electromagnetic interference can be an expensive action performed by a radar system that includes detecting and excising interference from receive signals, e.g., a process that can be difficult to perform in near real-time or real-time.

The radar upgrade kit can provide advanced capabilities in tracking objects with high maneuverability, as well as improved resolution and accuracy for detecting small objects with low values of radar cross-section (RCS) and signal-to-noise ratio (SNR). This can include precipitation and weather patterns that are detected by radar systems to support travel, air traffic control, etc. The radar upgrade kit can leverage high-bandwidth detections to improve classification of types of precipitation, their respective intensity, and durations.

Other advantages of the radar upgrade kit include improved detection processing with adaptive constant false alarm rate algorithms that adapt a threshold value for detecting objects, which can support detection of small targets and improve target prioritization. The GPUs of the radar upgrade kit can also provide improved range measurement accuracy through improved time synchronization of the received detections, as well full-range processing of entire receive beam range windows for improving search volume and track capacity. The digital-to-analog converters of the radar upgrade kit, coupled with the additional processing provided by the GPUs, can provide capabilities such as spoiling a transmit beam with multiple receive beams to reduce beamshape loss and increase sensitivity for detecting small objects, e.g., low values for RCS.

The radar upgrade kit also provides time synchronization for receive channels of the radar upgrade kit, by serving as an intermediary system between the upgraded signal processing pipeline of the radar system and the pre-existing signal processing pipeline of the radar system. The radar upgrade kit includes multiple types of signal processing hardware to provide real-time processing of the received signals for the radar system and can inject transmit waveforms into existing radar hardware such as transmitters and arrays. Furthermore, the radar upgrade kit can integrate the upgraded signal processing pipeline with a modular interface that connects to the existing radar system back-end software to maximize advantages of upgraded digital beamforming capabilities. The modularity of the components from the radar upgrade kit also provide that the radar upgrade kit can connect to any type of existing radar signal processing pipeline of a radar system.

In an aspect, a system includes an antenna subsystem having a preexisting processing pipeline, configured to receive radio frequency returns and an upgraded signal processing pipeline coupled to the preexisting processing pipeline. The upgraded signal processing pipeline is configured to perform detection processing for the antenna subsystem and includes a plurality of sampling converters that are configured to directly sample the radio frequency returns of the antenna subsystem, a plurality of field-programmable gate array devices that are configured to generate detection data of the radio frequency returns at full-bandwidth and full-range of the antenna subsystem, and a plurality of graphics processing units that are configured to apply one or more algorithms to the detection data of the radio frequency returns. The upgraded signal processing pipeline includes a signal processor configured to perform operations on the sampled radio frequency returns. The operations include sampling, by the plurality of sampling converters, the radio frequency returns of the antenna subsystem, generating, by the plurality of field-programmable gate array devices, detection data representing the sampled radio frequency returns within full-bandwidth and full-range of the antenna subsystem, applying, by the plurality of graphics processing units, one or more algorithms to the detection data to determine output data for the preexisting processing pipeline of the antenna subsystem, and providing the output data to the preexisting processing pipeline of the antenna subsystem.

In some implementations, the preexisting processing pipeline of the antenna subsystem further includes radar control software, and the upgraded radar signal processing pipeline is further configured to provide the output data to the radar control software of the antenna subsystem. The plurality of sampling converters include analog-to-digital converters (ADC) configured to generate samples of the radio frequency returns, the samples including digital representations of the radio frequency returns of the antenna subsystem.

In some implementations, the output data includes data related to one or more detected objects of the radar system. The data related to the one or more detected objects further includes at least one of (i) values related to an object of the one or more detected objects (ii) labels related to an object of the one or more detected objects.

In some implementations, the one or more algorithms includes performing at least one (i) adaptive thresholding, (ii) matched filtering, (iii) digital calibration, (iv) angle of arrival estimation, or (v) maximum likelihood estimation, based on the detection data.

In some implementations, the system includes a transmitter amplifier subsystem coupled to the antenna subsystem, a control subsystem of the upgraded signal processing pipeline being configured to provide the output signals for digital waveforms to the transmitter amplifier. The plurality of sampling converters can include digital-to-analog converters (DAC) configured to convert the output signals from a digital waveform into an analog waveform for transmission by the transmitter amplifier subsystem.

In some implementations, the plurality of graphics processing units are configured to apply at least one pulse compression technique of one or more pulses corresponding to the detection data. Each of the plurality of sampling converters can be high-speed sampling converters configured to obtain at least a rate of 10 giga samples per second.

In some implementations, the system can include a control subsystem configured to provide output signals to the antenna subsystem, the output signals including digital waveforms for the antenna subsystem to generate and transmit beams corresponding to the digital waveforms. In some implementations, the plurality of graphics processing units are configured to process the detection data from the radio frequency returns from within a range window of one or more received signals corresponding to the radio frequency returns of the antenna subsystem. The plurality of graphics processing units can be further configured to synchronize timing data related to the one or more received signals.

In an aspect, a system includes an antenna subsystem having a preexisting processing pipeline, configured to receive radio frequency returns, an upgraded signal processing pipeline coupled to the preexisting processing pipeline, the upgraded signal processing pipeline configured to perform detection processing for the antenna subsystem. The upgraded signal processing pipeline includes a plurality of sampling converters that are configured to directly sample the radio frequency returns of the antenna subsystem, a plurality of field-programmable gate array devices that are configured to generate detection data of the radio frequency returns at full-bandwidth and full-range of the antenna subsystem, and a plurality of graphics processing units that are configured to apply one or more algorithms to the detection data of the radio frequency returns. The upgraded signal processing pipeline includes a signal processor configured to perform operations on the sampled radio frequency returns, the operations include sampling, by the plurality of sampling converters, the radio frequency returns of the antenna subsystem, down-converting, by the plurality of field-programmable gate array devices, the sampled radio frequency detections, and filtering, by the plurality of field-programmable gate array devices, the down-converted sampled radio frequency detections. The operations also include pre-processing the filtered down-converted sampled radio frequency returns to generate digitized radio frequency returns, applying, by the plurality of graphics processing units, one or more algorithms to the detection data to determine output data for the preexisting processing pipeline of the antenna subsystem, and providing the output data to the preexisting processing pipeline of the antenna subsystem.

In some implementations, the system further includes a control subsystem configured to provide output signals to the antenna subsystem, the output signals including digital waveforms for the antenna subsystem to generate and transmit beams corresponding to the digital waveforms. The digital waveforms can further include one or more phase weightings corresponding to each subarray of the antenna subsystem, the one or more phase weightings being determined by the signal processor. The control subsystem can be further configured to generate multiple receive beams for a respective transmit beam, the transmit beam corresponding to one or more of the digital waveforms. In some implementations, the digital waveforms include phase-coded waveforms that enable the antenna subsystem to perform radar imaging of objects, each phase-coded waveform includes a unique antenna pattern for the antenna subsystem. In some implementations, the signal processor is configured to generate a radar image of an object using the one or more algorithms of the plurality of graphics processing units, in response to receiving multiple phase-coded beams.

In some implementations, the signal processor is further configured to perform operations including identify, by the one or more algorithms of the plurality of graphics processing units, one or more detections of the detection data indicating electromagnetic interference, removing, by the one or more algorithms of the plurality of graphics processing units, the one or more detections from the detection data indicating electromagnetic interference, and providing remaining detections from the detection data as the output data for the preexisting processing pipeline of the antenna subsystem.

In some implementations, down-converting the sampled radio frequency detections includes generating detection data for the sampled radio frequency detections at a second frequency lower than a first frequency of the sampled radio frequency detections.

In some implementations, filtering the down-converted sampled radio frequency detections includes removing a subset of the detection data for the down-converted sampled radio frequency detections below a threshold value. The threshold value can be one or more of (i) a value for signal-to-noise ratio, (ii) a value for radar cross section, or (iii) a value indicating likelihood that a radio frequency detection includes electromagnetic interference.

In some implementations, pre-processing the filtered down-converted sampled radio frequency returns to generate digitized radio frequency returns includes interpolating the filtered down-converted sampled radio returns from a first bandwidth of the sampled radio frequency detections to a second bandwidth of a transmit beam that resulted in one or more of the radio frequency detections.

In an aspect, a rack of a radar upgrade system includes a plurality of radio frequency cables configured to connect to an antenna subsystem that includes a pre-existing signal processing pipeline from an upgraded signal processing pipeline of the radar upgrade system, the plurality of radio frequency cables establishing one or more receive channels for the antenna subsystem. The rack also includes one or more data capture servers configured to sample data from the one or more receive channels of the antenna subsystem and one or more graphical processing unit servers including a signal processor, a plurality of graphical processing units, and a plurality of field-programmable gate array devices, the one or more graphical processing servers configured to generate output data based on the data from the receive channels of the antenna subsystem. The rack includes a global positioning system server, configured to provide synchronization data to a distribution chassis, the distribution chassis configured to synchronize signals between servers of the rack to one or more additional racks of the radar upgrade system.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1A:
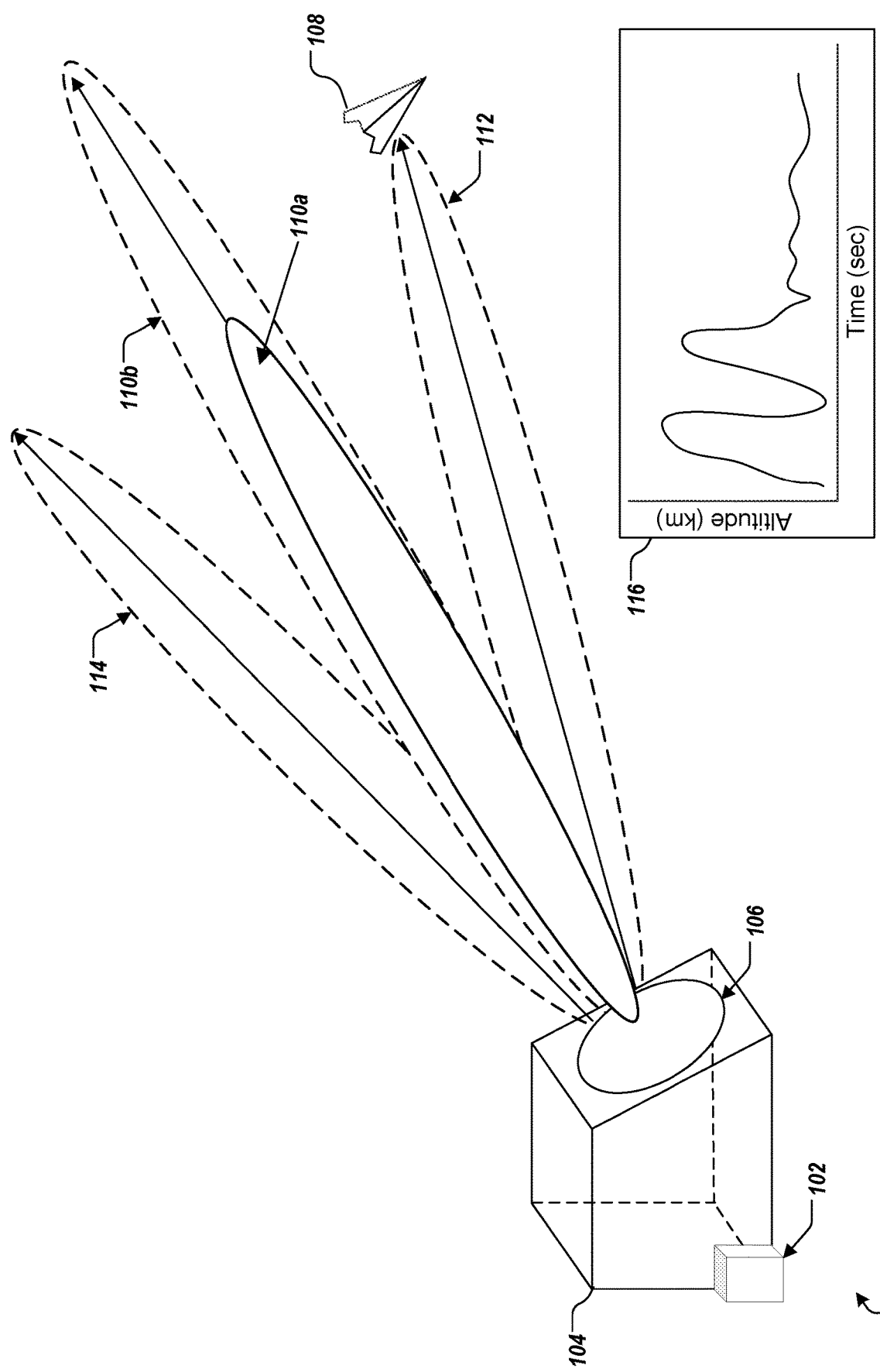
FIGS. 1A, 1B, and 1C illustrate an example radar system upgraded by a radar upgrade kit.

FIG. 1A illustrates an example radar system 104 upgraded by a radar system upgrade kit 102 (also referred to as a "radar upgrade kit"), performing radar applications to detect objects in support of missile defense, though other radar applications are also possible.

A radar system 104 is configured to search, detect, and track targets in an environment 100, by transmitting and receiving radio frequency (RF) signals, e.g., representing RF detections from one or more objects in the environment 100. The radar system 104 utilizes an antenna array 106 (e.g., frontend hardware of the radar system 104) to emit beams and scan space (e.g., airspace) in the environment 100. The antenna array 106 (also referred to as "antenna 106") can include a number of subarrays (e.g., further described in FIG. 2A below) that each include a number of transmit/receive elements and phase-shifters to perform analog beamforming, e.g., to steer beam 110a to search for objects in the environment 100.

The radar system 104 also includes a preexisting signal processing pipeline (e.g., backend software and hardware) to process received RF detections for objects (e.g., aircraft, missiles, drones) in the airspace. As illustrated, the radar system 104 can be upgraded by a radar upgrade kit 102 that includes an upgraded signal processing pipeline, further described in FIGS. 2A-2B below. By coupling the radar system 104 with the radar upgrade kit 102, the upgraded signal processing pipeline can leverage additional hardware and/or software components to improve the performance of radar system 104 and provide digital beamforming capabilities. The upgraded signal processing pipeline of the radar upgrade kit 102 can provide increased computing power, thereby providing the radar system 104 to process detections with a lower signal-to-noise ratio with fewer false alarms, e.g., due to clutter and other types of scattered detections, compared to processing performed by the radar system 104 without the radar upgrade kit 102. The upgraded signal processing pipeline of the radar upgrade kit 102 can also provide complex algorithmic capabilities, thereby providing support to the radar system 104 to perform functions such as searching and detecting objects, estimating trajectories of the detected objects, classifying a type of the detected objects, and mitigating electronic interference.

The radar system 104 can transmit beam 110a using the preexisting signal processing backend of the radar system 104, providing the beam 110a at a particular range extent. The antenna array 106 can steer the beam 110a to scan a region of space in environment 100 across different angles in azimuth and elevation. An example of an object 108 that the radar system 104 is configured to track when performing missile defense includes, e.g., a hypersonic glide vehicle, drone, missile, aircraft, among other objects. As illustrated, the radar system 104 is unlikely to detect object 108 using beam 110a. Referring to graph 116, a profile of the altitude of object 108 is illustrated over time. The object 108 can be difficult to detect and estimate trajectories (e.g., track) using analog beamforming techniques by the preexisting signal processing pipeline of the radar system 104, as the object 108 can change directions (e.g., divert) and may have a small cross-section that is difficult to obtain RF detections. For example, object 108 can quickly change direction and a radar system 104 without the radar upgrade kit 102 can be unable to generate enough beams to acquire the object 108 and maintain track. As another example, the SNR of the RF detections received from the object 108 may be below a threshold value (e.g., in dBsm) that is sufficient for the radar system 104 to estimate trajectories of the object 108 without additional processing power, e.g., by the upgraded signal processing pipeline of the radar upgrade kit 102.

The radar system 104 is coupled to a radar upgrade kit 102 that leverages an upgraded signal processing pipeline (e.g., further described in FIGS. 2A and 2B below) to support functions of the radar system 104, e.g., searching for objects, tracking the detected objects, and identifying the type of the detected object. In some implementations, the upgraded signal processing pipeline of the radar upgrade kit 102 enables the antenna array 106 to transmit and receive multiple beams at different angles simultaneously, as well as achieve beams with a greater range extent compared to an example radar system without a radar upgrade kit 102. For example, the radar system 104 upgraded by radar upgrade kit 102 can emit beams 110b, 112, and 114 that are steered by antenna array 106. The beam 110b is steered in a similar direction to beam 110a, but with a greater range extent compared to beam 110a. Beams generated by radar system 104 with greater range extents can detect objects further away in range from the radar system 104, e.g., providing earlier detection of objects compared to radar system 104 without the radar upgrade kit 102.

In some implementations, the radar system 104 upgraded by radar upgrade kit 102 leverages the simultaneously generated additional beams (e.g., beams 112 and 114) to achieve a larger search volume (e.g., compared to the search volume generated by the radar system 104 alone). Larger search volumes provided by the radar upgrade kit 102 can improve the probability of acquisition of object 108 by radar system 104, e.g., increasing the likelihood of detecting object 108 to generate a respective track for the detected object. Providing additional beams can enable consistent tracking of object 108 despite high maneuverability of the object 108, e.g., tracking of the object 108 can transition from beam to beam without dropping the track of object 108. As another example, providing beams with greater range extents (e.g., beams 110b, compared to beam 110a) can provide earlier detection of object 108, thereby improving trajectory estimations for object 108 and additional time for object classification. Furthermore, the beams generated by radar system 104 upgraded by radar upgrade kit 102 can have increased sensitivity due to the signal processing algorithms (further described in reference to FIGS. 2A and 2B below). The increased sensitivity of the beams provide detectability of objects with low radar cross-section, e.g., small objects including drones and hypersonic glide vehicles.

The radar system 104 upgraded by radar upgrade kit 102 can detect object 108 using any generated beams, but is illustrated acquiring object 108 by beam 112 to receive RF detections from the object 108. For example, the radar upgrade kit 102 provides that beams 114 and 110b can be simultaneously transmitted to scan different search volumes, e.g., to search for additional objects in the environment 100, while the radar system 104 maintains track of the object 108. By providing an upgraded signal processing pipeline, the radar upgrade kit 102 provides the radar system 104 with digital beamforming capabilities, improved detection processing, and additional processing capacity enabled by algorithms performed by the radar upgrade kit 102.

Figure 1B:
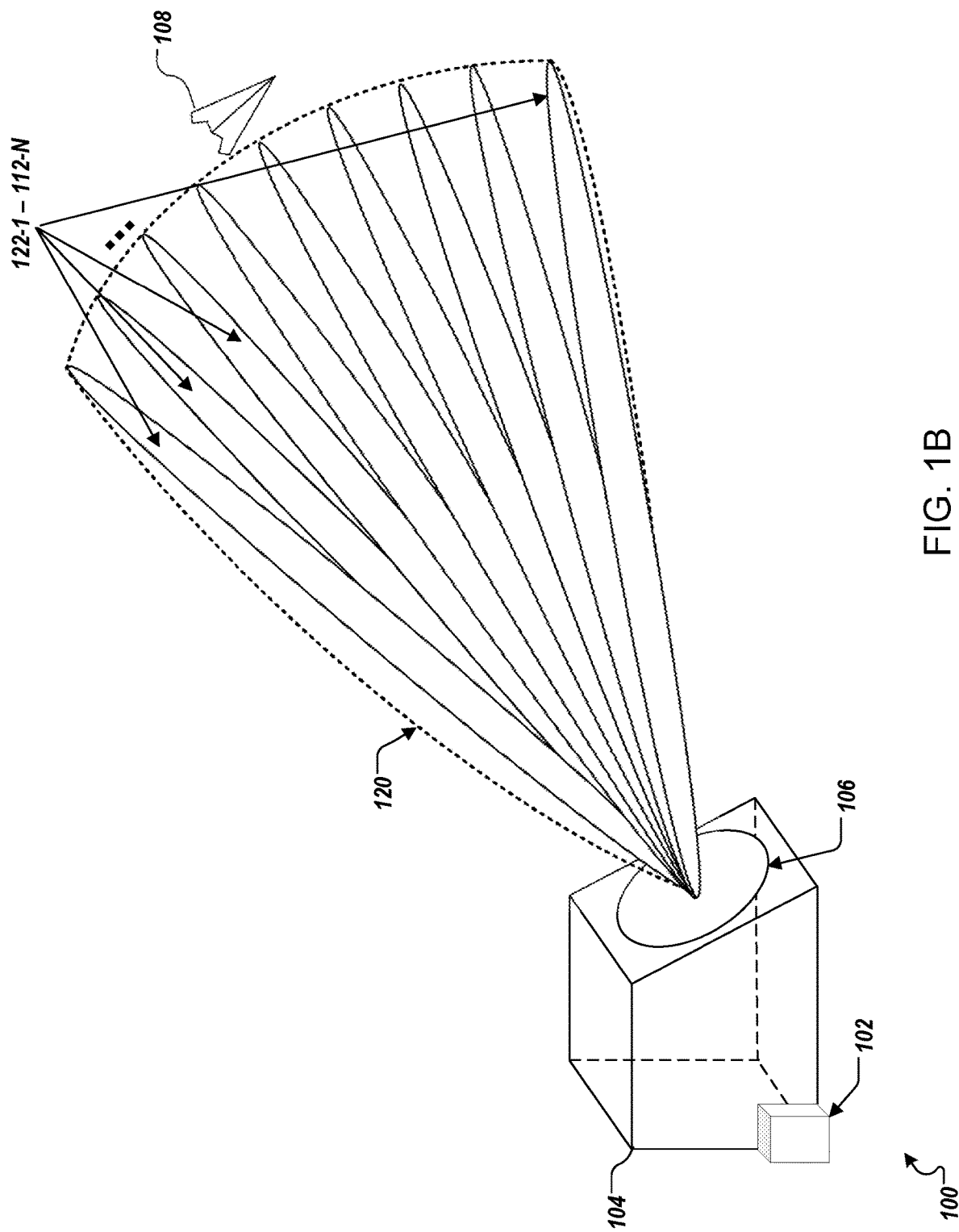

Referring to FIG. 1B, an example of a radar system 104 upgraded by radar upgrade kit 102 to detect and track object 108 by leveraging a transmit beam 120 transmitted by antenna array 106, which also receives multiple receive beams 122-1-122-N. The radar system 104 upgraded by radar upgrade kit 102 can provide multiple beams 122-1-122-N that are electronically steered (e.g., dynamically and responsively adjusted) and closely spaced to one another to provide improved detectability for tracking the object 108. The improved detectability can be achieved by focusing the receive beam, e.g., multiple receive beams, and detecting a peak in the receive signal corresponding to the target location. The multiple receive beams 122-1-122-N can provide lower beamshape loss and increased sensitivity (e.g., compared to a single beam provided by a radar system 104 without the radar upgrade kit 102) to detect targets with low RCS and SNR thresholds. Furthermore, multiple receive beams 122-1-122-N that are closely spaced to one another can enable transmit beam spoiling. For example, the energy corresponding to (e.g., emitted by a subarray) transmit beam 120 can be spread over a volume in space that can be received by the multiple receive beams 122-1-122-N.

Figure 1C:
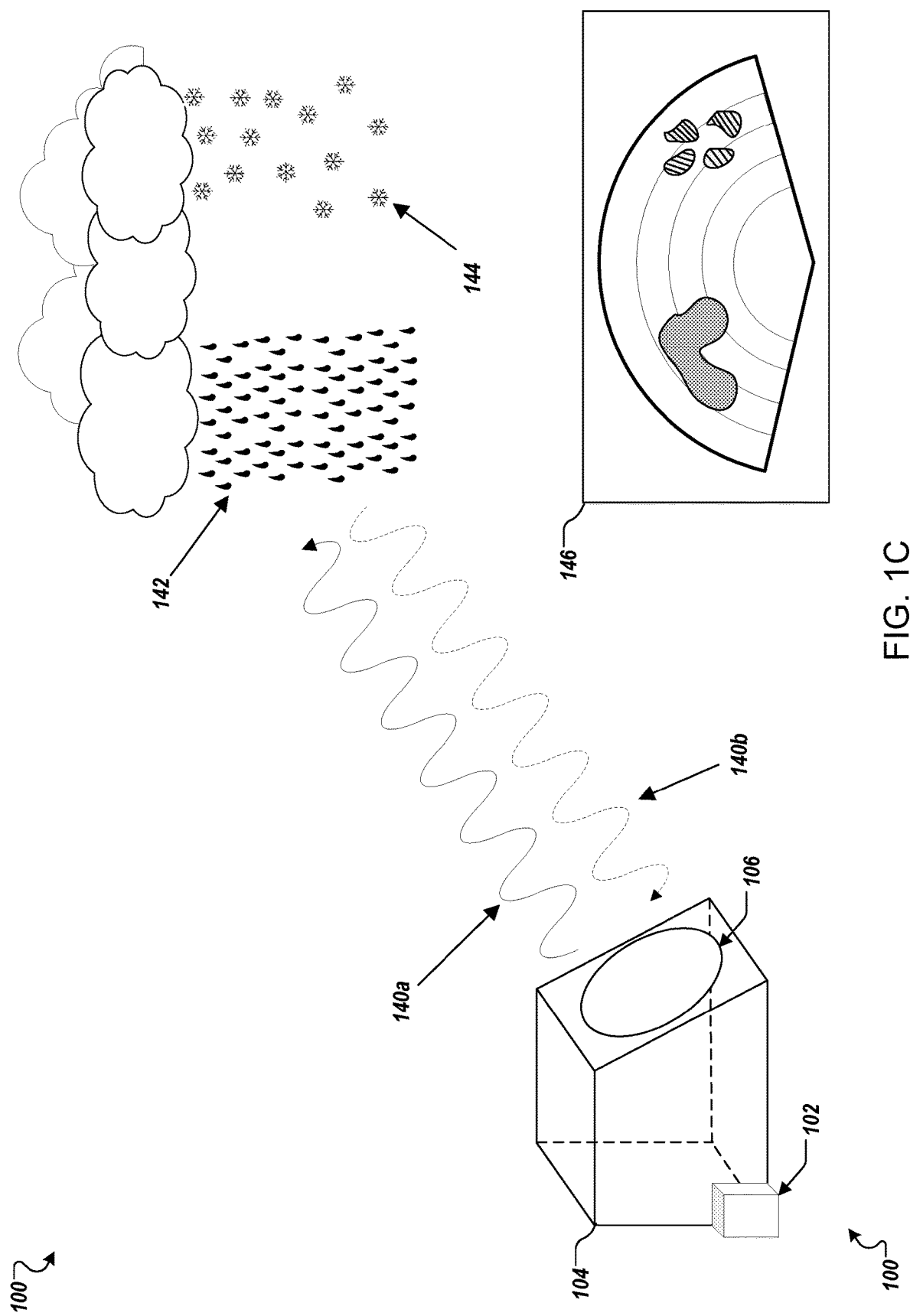

Referring to FIG. 1C, an example of a radar system 104 upgraded by radar upgrade kit 102 is illustrated, in which the upgraded radar system is configured to perform radar applications to detect different types of precipitation and weather patterns, such as rain 142 and snow 144. The upgraded signal processing pipeline provides processing resources and detection processing for high bandwidth applications with improved radar resolution in azimuth and elevation, which can be helpful for detecting types and severities of precipitation. For example, the radar system 104 with the upgraded signal processing pipeline of radar upgrade kit 102 can leverage transmit signal 140a, with corresponding receive signal 140b that can include returns from precipitation. A graph 146 illustrates processed outputs from the receive signal 140b to describe intensity, direction, and other characteristics of precipitation (e.g., rain 142, snow 144).

Figure 2A:
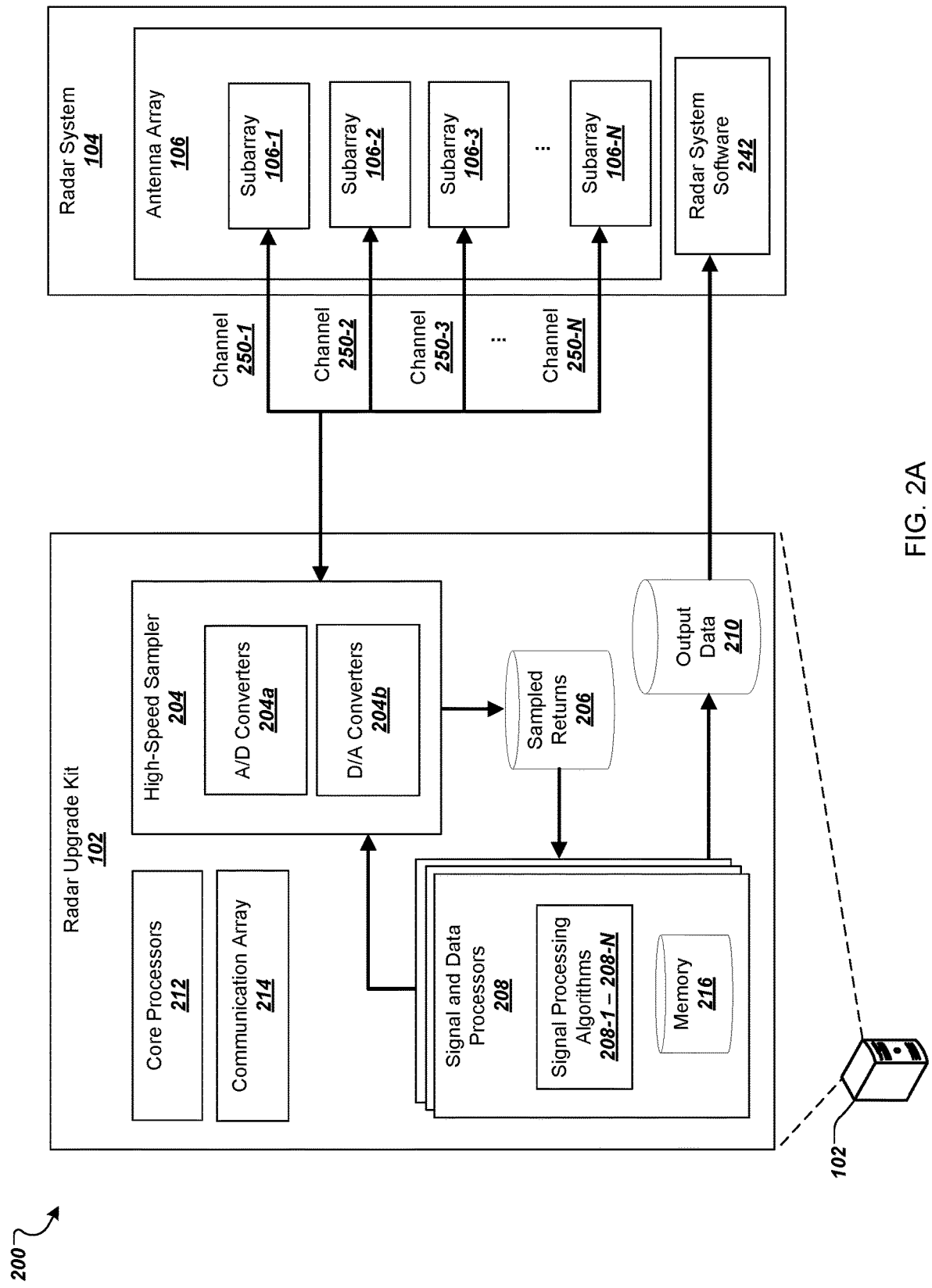
FIGS. 2A and 2B illustrate example backend hardware and software components of a radar upgrade kit upgrading the pre-existing signal processing pipeline of a radar system.

FIG. 2A illustrates the frontend hardware of an example of a radar system 104 coupled to the upgraded signal processing pipeline, e.g., backend hardware and/or software components, of the radar upgrade kit 102.

The radar system 104 is illustrated having the antenna array 106 (e.g., a component of the hardware frontend of radar system 104) to include subarrays 106-1-106-N, e.g., one or more subarrays, each subarray having a number of transmit/receive modules and phase shifters. Using analog beamforming techniques, the antenna array 106 of the radar system 104 provides the same signal (e.g., modulated RF signal) for transmit to each of the subarrays 106-1-106-N. A phase shifter for each subarray applies a phase shift on the same signal of the subarray that can be summed to output a single beam. As an example, the antenna array 106 can include 256 subarrays, each subarray includes 24 elements (e.g., transmit/receive modules) and 4-bit phase shifters to adjust the phase of the modulated RF signal provided to each of the subarrays. The radar system 104 is coupled, e.g., upgraded by, to the upgraded signal processing pipeline of the radar upgrade kit 102. In some implementations, the hardware frontend of radar system 104 includes components such as power amplifiers (as described in reference to FIG. 2B below) to drive signals to the subarrays 106-1-106-N of the antenna array 106.

The radar upgrade kit 102 includes a high-speed sampler 204 to process a respective receive signal from channels 250-1-250-N (also collectively referred to as "channels 250") for each subarray of the subarrays 106-1-106-N. The high-speed sampler 204 provides that the radar upgrade kit 102 can independently process all of the channels 250 and includes analog-to-digital (A/D) converters 204a and digital-to-analog (D/A) converters 204b. The A/D converters 204a provide that the radar upgrade kit 102 can process received RF detections (e.g., analog signals), thereby generating digitized signals representing the RF detections for high-bandwidth processing and full-range processing. In contrast, processing performed by an example radar system 104 without a radar upgrade kit 102 can be limited by the bandwidth and range of the detections received. For example, the A/D converters 204a can capture more samples of the receive signals compared to the samplers of the pre-existing signal processing pipeline, thereby providing less noise (e.g., improved SNR) and improved signal representation (e.g., range resolution) of a detected object. Furthermore, higher sampling rates provided by A/D converters 204a enable higher bandwidth through wide coverage (e.g., signals with large ranges of frequencies available), for high bandwidth applications such as weather pattern tracking. In some examples, the A/D converters 204a provide high speed sampling of receive signals to enable simultaneous processing of detections in different portions of a range window.

The D/A converters 204b provide that the radar upgrade kit 102 can digitally generate phase coded waveforms from the signal and data processors 208 into analog waveforms for transmit, e.g., by the antenna array 106. The D/A converters 204b can provide complex waveforms that were previously unavailable to the radar system 104 with the preexisting signal processing pipeline by adding the radar upgrade kit 102 to the radar system 102. In some implementations, the high-speed sampler 204 includes 14-bit analog-to-digital converters (e.g., A/D converters 204a) that can sample receive signals and 14-bit digital-to-analog converters (e.g., D/A converters 204b) to provide complex transmit waveforms for algorithmic capabilities added to radar system 104 by radar upgrade kit 102. The high-speed sampler 204 can sample the receive signals by storing bits, e.g., 8 bits, 16 bits, 32 bits, of data per sample.

The high-speed sampler 204 can obtain receive signals from the antenna array by connecting the radar upgrade kit 102 to the subarrays 106-1-106-N of the antenna array 106, e.g., thereby establishing channels 250-1-250-N. The A/D converters 204a and D/A converters 204b are modular components of the radar upgrade kit 102 to simultaneously provide returns through receive channels from each subarray of the radar system 104. In example configurations of the radar system 104 without the radar upgrade kit 102, radar inoperability can result from faults in the pre-existing radar signal processing pipeline. The channels 250-1-250-N provided by connecting the radar upgrade kit 102 provide that the radar system 102 can continue to operate with minimal performance degradation.

The modularity of the A/D converters 204a and D/A converters 204b provide that failures, e.g., in hardware and/or software, occurring in one or more channels of the upgraded signal processing pipeline do not affect the ability to obtain RF detections from receive signals in the remaining channels. Modular components leveraged in the high-speed sampler 204 can be more readily replaced with minimal impact to the system, e.g., by replacing components in the radar upgrade kit 102, compared to approaches that include replacing hardware at the subarray level, e.g., subarrays 106-1-106-N of the antenna array 106. Furthermore, upgrades performed in the radar upgrade kit 102 can be performed without updating radar software and/or hardware of the radar system 104, thereby eliminating computational complexity in adding capabilities such as digital beamforming.

The high-speed sampler 204 processes (e.g., samples) the RF returns from the channels 250-1-250-N of the subarrays 106-1-106-N and stores the sampled radar data as sampled returns 206, where it can be processed by signal and data processors 208. In some implementations, the high-speed sampler 204 includes A/D converters 204a and D/A converters 204b that to sample detections from the channels 250-1-250-N at a high sampling rate, e.g., 10 giga samples per second (GSPS). By sampling individual receive channels 250-1-250-N, the application of digital beamforming techniques performed by signal and data processors 208 by signal processing algorithms 208-1-208-N can provide improved sensitivity, e.g., improving the signal-to-noise ratio of each channel. Performing digital beamforming techniques can provide that the noise of two or more receive channels is de-correlated (e.g., compared to analog beamforming techniques, in which each channel will have different locations of peak noise) when performing a summing operation. De-correlating noise in a digital beamformer can improve SNR compared to the same set of detections processed by an analog beamformer, improving sensitivity and achieving more accurate estimates of trajectory and probability of acquisition for objects. In some implementations, the pre-existing radar system signal processing pipeline is entirely analog, in which the radar upgrade kit 102 can provide digital beamforming capabilities by leveraging the signal and data processors 208 and the high speed sampler 204.

The high-speed sampler 204 samples detections at high sampling rates (e.g., 2 GSPS and above) to enable the radar upgrade kit 102 to accurately track RF envelopes (e.g., of the RF receive signals), thereby providing improved position accuracy of a detected object. By providing improved accuracy of RF envelopes that can be matched to respective RF receive signals, the achieved super-resolution provides that the radar system 104 can reduce impacts of bandwidth and range resolution limitations of the pre-existing signal processing pipeline of radar system 104. For example, the radar upgrade kit 102 can perform envelope matching to achieve high range accuracy, instead of processing significant volumes of data associated with full-bandwidth, full-range processing of detections.

The radar upgrade kit 102 provides additional processing power to the radar system 104 to process significant volumes of data associated with full-bandwidth, full-range window processing. The full-bandwidth of the data provides improved range resolution (e.g., as range resolution is a function of bandwidth), with further improvement enabled by the high sampling rates of the high-speed sampler 204. Implementations of the radar system 104 without the radar upgrade kit 102 cannot process full range windows at full bandwidth due to the computational demands, and therefore compromise range accuracy when detecting objects.

In some implementations, the samples generated by high-speed sampler 204 also enable the radar upgrade kit 102 to utilize parallel polyphase matched filter banks, by down-sampling (e.g., decimating) or upsampling (e.g., interpolating) detections after applying filters (e.g., a single filter broken down into multiple, parallel filters) for a single pulse of the radar system 102. The radar upgrade kit 102 can leverage parallel filter banks and capture improved accuracy in position and velocity estimates.

The radar upgrade kit 102 can include one or more signal and data processors 208 that retrieve the sampled returns 206 and perform algorithms to generate output data 210. The output data 210 provided by the radar upgrade kit 102 to the radar system 104 leverages the improved processing provided by the upgraded signal processing backend of the radar upgrade kit 102. For example, the signal and data processors 208 can include hardware such as field-programmable gate arrays (FPGAs) and graphics processing units (GPUs) that can perform complex processing on RF returns received by the antenna array 106 (e.g., including its subarrays 106-1-106-N). The signal and data processors 208 can also include memory 216 for components such as the GPUs, for operation of the signal processing algorithms 208-1-208-N, e.g., to store pulses in GPU memory.

One or more FPGAs can perform pre-processing operations on RF detections prior to one or more of the signal processing algorithms 208-1-208-N being applied to the RF detections. For example, the FGPAs can perform digital down-conversion on the sampled returns 206 at a first receive frequency, e.g., ultra-high frequency (UHF) samples of a signal, to achieve a second frequency that is lower than the first receive frequency. In some implementations, the FPGAs of signal and data processors 208 operate concurrently with the high-speed samplers 204, e.g., by A/D converters 204a, to sample the receive signal data from channels 250-1-250-N at a different sampling rate, e.g., a sampling rate suitable for processes such as down-conversion and filtering. By down-converting a receive signal, the FPGAs can preserve detection data at a particular frequency band of the originally received signal. In some implementations, the FPGAs interpolate and filter RF detections (e.g., in addition to down-conversion) into a bandwidth that matches the transmit signal provided by the antenna array 106, e.g., that generated the transmit signal that was reflected by a detected object to obtained the received RF detections.

For example, the FPGAs can interpolate, downconvert, and filter samples at ultra-high frequencies into a bandwidth that matches the transmitted chirp waveforms (e.g., 5 MHz) of the antenna array 106. By digitally filtering the sampled returns 206 or the receive signals of channels 250-1-250-N, the signal and data processors 208 can leverage improvements (e.g., higher values) in SNR of the detections and increase the dynamic range of the detections, e.g., ratios between largest and smallest values in RCS, SNR, and other values corresponding to radar data. The signal and data processors 208 can apply sharp cutoffs at particular frequencies after digitally filtering the sampled returns 206 to remove portions of detections that include electromagnetic interference. Furthermore, the digitally filtering of the sampled returns 206 also provides that the signal and data processors 208 can align timing and calibrate for dispersion of UHF signals, accounting for atmospheric corrections and possible delays.

One or more GPUs of the signal and data processors 208 can be configured to support specific applications of the radar system 104, by performing signal processing algorithms 208-1-208-N corresponding to complex radar applications. For example, the GPUs of the signal and data processors 208 can be configured to simultaneously process detections and generate output data 210 for a radar application such as object detection, classification, and trajectory estimation. Radar applications can be performed by the radar system can be configured by radar system software 242, described with reference to FIG. 2B below. The GPUs of the signal and data processors 208 can perform parallel operations of multiple sets of data, with numerous cores (e.g., thousands) that apply processing techniques (e.g., from signal processing algorithms 208-1-208-N that are complex to execute). For example, complex signal processing algorithms to mitigate electronic interference may require complex mathematical calculations to be performed on multiple sets of RF detections simultaneously, in near real-time, to detect and excise any detected interference in the RF detections. In some implementations, the GPUs perform high performance compute, e.g., 150 teraflops (trillions of floating points operations per second) and run fast Fourier Transform correlators with arbitrary waveforms, e.g., digitally generated waveforms that can be sampled by D/A converters 204b into analog transmit signals for antenna array 106.

As an example, the GPUs can be tailored to perform tensor-based algorithms to support applications in detecting objects, estimating trajectories, classifying objects, and mitigating electromagnetic interference. Some of these tensor-based algorithms can include numerous matrix multiplications and resource-intensive processing with large datasets. For example, dynamic digital beamforming techniques include multiple matrix computations to estimate angle of arrival for one or more objects. These matrix computations can include large sets of state vector data, covariance data, etc.

The GPUs can leverage dynamically adaptable tensor cores to perform numerous calculations (e.g., trillions of floating point operations per second). In some implementations, some or all of the GPUs can be tailored to a type of signal processing application provided by the radar upgrade kit 104. As an example, the GPUs can perform electromagnetic interference mitigation by processing multiple sets of radar data simultaneously (e.g., in parallel) and determine an interference pattern. The determined interference pattern can be leveraged to incoming receive signals and excised from the detections to reduce the impact of the electromagnetic interference, e.g., thereby maintaining quality of estimated trajectories of detected objects. As another example, the track algorithms performed by the GPUs can include various types of filters (e.g., Kalman, variations of the Kalman Filter), model based techniques, hypothesis testing, etc. These track algorithms performed by the GPUs can include large datasets representing state vectors for the detected objects, in which multiple matrix operations are performed to estimate predicted trajectories for the detected objects.

As another example, the GPUs and FPGAs enable the signal and data processors 208 to detect signals at lower signal-to-noise ratios (e.g., values for SNR) by allowing more candidate detections into the detection process, e.g., compared with a radar system 104 without the radar upgrade kit 102. The GPUs and FPGAs can also enable the signal and data processors 208 to prune (e.g., filter) detections that do not result in a track (e.g., through multiple-hypothesis tracking), thereby improving track fidelity. Furthermore, the GPUs and FPGAs can also store pulses with low SNR detections in memory (e.g., memory 216) and integrate multiple successive pulses with varying hypotheses in target velocity, range, etc. By integration across multiple successive pulses in GPU memory, the signal and data processors 208 can detect/resolve integrated target signals within the noise of the signals.

The signal processing algorithms 208-1-208-N (also referred to as "algorithms 208-1-208-N") performed by the GPUs of signal and data processors 208 that include one or more algorithms to process RF detections obtained by the antenna array 106. The GPUs can perform algorithms 208-1-208-N including digital pulse compression for receive signals that are generated in response to chirp transmit waveforms, by compressing the energy spread of the received signal into a shorter time window and thereby increasing range resolution and SNR of the detected object represented in the received signals. As another example, the GPU can perform algorithms 208-1-208-N that utilize, e.g., digital Doppler filter banks to extract Doppler information of a detected object. In some implementations, the algorithms 208-1-208-N performed by the GPUs provide intelligent beam placement, e.g., by placing multiple beams simultaneously to scan larger volumes of space and acquire more targets, compared to a radar system 104 without a radar upgrade kit 102. The radar upgrade kit 102 can simultaneously process multiple beams by applying and processing multiple phases weights for each subarray 106-1-106-N of the antenna array 106 for the radar system 104.

In some implementations, the GPUs performing the algorithms 208-1-208-N enable improved resource scheduling of radar resources, e.g., by provisioning or freeing up additional resources of the radar system 104 to perform processing while the radar upgrade kit 102 performs additional radar searching, detecting, and tracking of objects. For example, the GPUs performs numerous (e.g., millions) computations per second to support searching and tracking algorithms to detect objects from further ranges, e.g., large range extents with respect to the radar system 104. In some implementations, the GPUs can leverage tracking algorithms based on multiple models and hypothesis testing.

The algorithms 208-1-208-N performed by the GPUs can also include adaptive thresholding of the constant false alarm rate (CFAR) of the sampled returns 208, to maintain a fixed probability of detection and fixed probability of false alarm, e.g., particularly when the radar system 104 detects clutter. Improved and adaptive CFAR thresholding can enable detection of smaller targets and provision radar resources based on target priorities, by dedicating additional processing resources of the radar upgrade kit 102 and/or the radar system 104 to track objects with higher likelihoods of being a target.

For example, the GPUs can perform numerous tensor-based calculations per second to determine a threshold based on the RF detections, e.g., dynamically computing a threshold value, using one or more detection algorithms. The threshold value generated by performing the detection algorithms can indicate that detections with RCS values above the threshold are classified as objects (e.g., object 108), whereas RCS values below the threshold can be classified as clutter (e.g., surface, volume, point) from various sources. In some implementations, the GPUs can quickly estimate the threshold value as a noise floor, indicating detections above the noise floor as objects to generate trajectories estimates and detections below or near the noise floor as unassociated to the detected objects.

These algorithms can also include improved estimates for angle of arrival of detection objects, improving angular accuracy of the detected object for better estimations of the detected object's trajectory. Furthermore, the GPUs can perform adaptive digital calibration to align timing, spectrum, phase, and amplitudes of a radar test source and minimize beam sidelobes to minimize errors resulting from poor calibration of the antenna elements of the antenna array 106. As another example, the algorithms 208-1-208-N performed by the GPU can provide improved time synchronization of the RF detections and improve the range measurement accuracy, as signal and data processors 208 can be synchronized by the GPUs, which have low processing latency as the GPUs are highly tailored to specific applications.

The signal and data processors 208 can provide full-range processing, by processing the sampled returns 206 of an entire receive beam range window (e.g., corresponding to a received signal of the antenna array 106). Due to the low latency and additional processing resources provided by the GPUs, the signal and data processors 208 can process large volumes of datasets, improve search volume (e.g., number and size of beams placed in an environment by a radar system 104), and track numerous objects. The signal and data processors 208 can also provide increased bandwidth for improved range resolution, as more samples of the receive signal can be processed by the GPUs of the signal and data processors to obtain higher bandwidth data. In some implementations, the signal and data processors provide transmit waveforms that include transmit beam nulling that can null (e.g., zero-out) electromagnetic interference detected in the receive waveform, based on estimating a location (e.g., range, azimuth, elevation) of the source generating the electromagnetic interference.

In some implementations, the signal and data processors 208 provide waveforms for the radar system 104 to transmit, but using multiple receive beams for the same transmit beam, e.g., transmit beam spoiling. By supporting the processed loads corresponding to spoiling the transmit beam, the radar upgrade kit 102 provides that the radar system 102 can achieve lower beamshape loss and increased sensitivity to detect targets with low RCS and SNR thresholds, such as hypersonic glide vehicles and drones. The signal and data processors 208 can be tailored to identify the HGVs and estimate trajectories with low RCS and SNR thresholds, compared to a radar system 104 that only leverages a preexisting signal processing pipeline.

As another example, the signal and data processor 208 can provide digital beamforming techniques (further described in FIG. 3 below) to improve receive directionality, as multiple simultaneous receive beams provide a lower beamshape loss (e.g., compared to using a single beam at one instance) for the antenna array 106. The lower beamshape loss provides increased sensitivity and detectability of objects within the transmit beam, resulting in improved detection of smaller objects at long ranges. These digital beamforming techniques also provide that a number of sophisticated algorithms such as maximum likelihood estimation can be utilized with the sampled returns 206 to achieve increased angle measurement accuracy and resolution. Further description of the algorithms and processing performed by signal and data processors 208 is described in FIG. 3 further below.

The output data 210 provided by the radar upgrade kit 102 can include improved Doppler measurements, maintaining the phase-integrity of a down-sampled signal without utilizing an I/Q mixer (e.g., simultaneously modulating both the in-phase and quadrature components of the signal). The improved Doppler measurements can also include longer durations of coherence time between transmit and receive pulses, e.g., stable phase relationships for longer durations of time. The output data 210 can also include data with detections and estimated trajectories with improved clutter rejection, by accounting for atmospheric diffraction and dispersion, as well as using multi-path models (e.g., extraneous scattered detections causing Doppler frequency spread) for estimating ground clutter. In other words, the additional computing resources (e.g., GPUs) provided by the upgraded signal processing pipeline of the radar upgrade kit 102 can account for additional factors that can be previously considered too difficult to process.

As another example, the output data 210 can also provide improved estimates for angle of arrival (e.g., direction of the receive signal) for a detected object, by applying signal processing algorithms 208-1-208-N to the sampled returns 206 generated by high-speed sampler 204. As high-speed sampler 204 provides additional samples of the receive signal related to the detected object, e.g., through high-speed sampling rates, the additional samples can be down-sampled while maintaining information regarding the phase of the detected object. Signals processed by the signal and data processors 208 can maintain phase information (i.e., which can be crucial to analog beamforming techniques), while providing the additional samples that when processed, provide improved accuracy in detecting and tracking an object. In some implementations, the output data 210 includes micro-Doppler data to classify objects based on the micro Doppler data, e.g., by applying one or more machine learning techniques to identify particularly small objects such as drones.

The signal and data processors 208 can also provide digital signals to the D/A converters 204b that can be converted to analog signals for transmission, e.g., by the antenna array 106. The digital signals provided by the signal and data processors 208 can enable the radar system 104 to perform radar imaging using phase-coded digitally generated waveforms, as described in FIG. 2B below.

The radar upgrade kit also includes core processors 212 and a communication array 214. The core processors 212 can include additional GPU and FPGA hardware to support operation of the radar upgrade kit, e.g., obtaining and/or providing transmit signals between the upgraded signal processing pipeline of the radar upgrade kit 102 and the pre-existing signal processing pipeline of the radar system 104. The communication array 214 can be a network interface card for high-speed networking, e.g., with one or more remote devices. These remote devices can include servers that aggregate output data 210, e.g., aggregating data processed by the upgraded signal processing pipeline of the radar upgrade kit 102. In some implementations, the communication array 214 includes a device capable of communication over a network, e.g., wireless network, local area network.

Figure 2B:
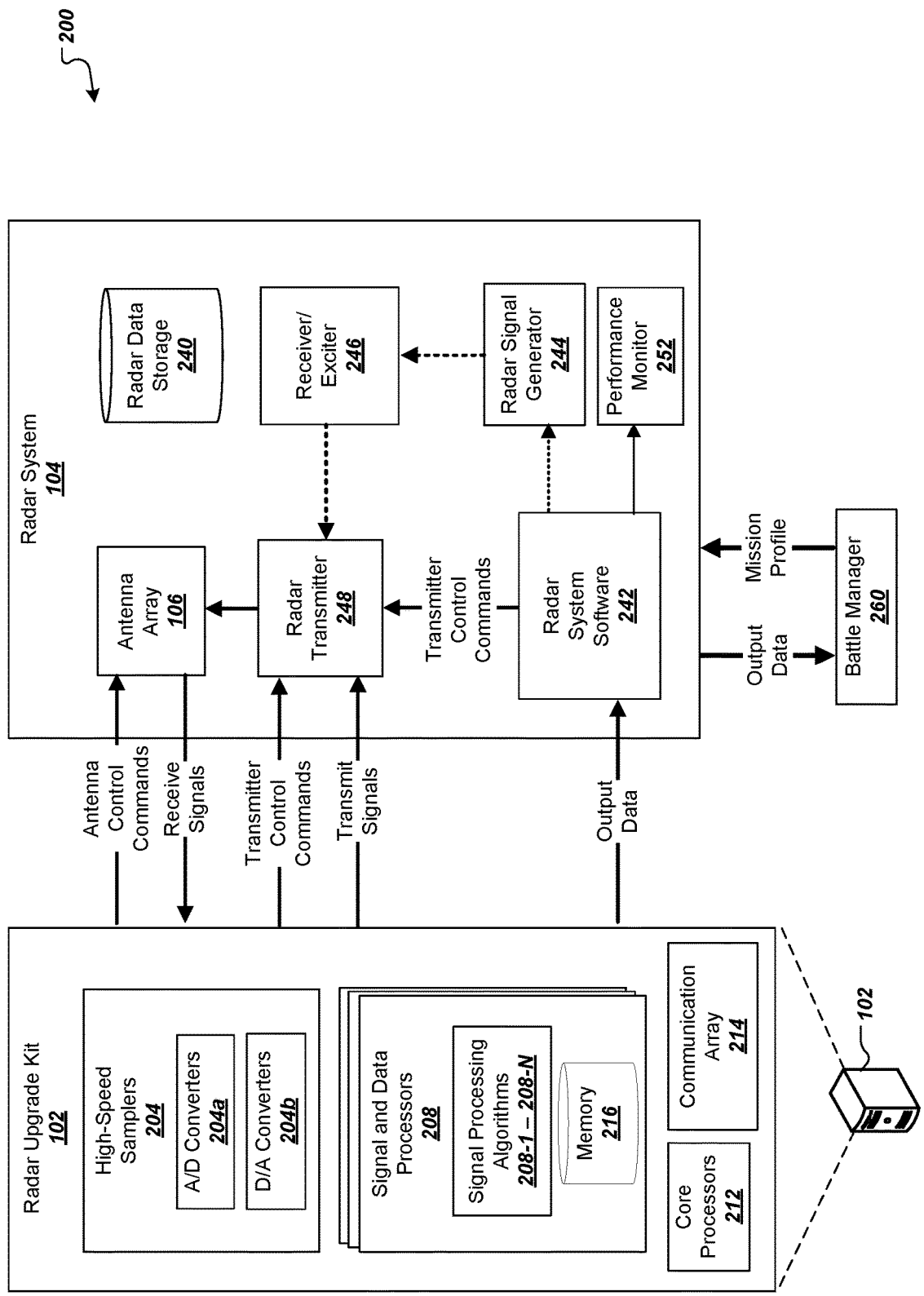

FIG. 2B illustrates an example diagram 200 of the hardware and software backend of the upgraded signal processing pipeline from the radar upgrade kit 102 to the preexisting signal processing pipeline of the radar system 104. The radar system 104 includes the radar system software 242 to control operations and transmit/receive instructions from a battle manager 260. The preexisting signal processing pipeline of the radar system 104 includes a radar signal generator 244, a receiver/exciter 246, a radar transmitter 248, and the antenna array 106, that can be upgraded by the upgraded signal processing pipeline of the radar upgrade kit 102. The upgraded signal processing pipeline of the radar upgrade kit 102 includes the high speed sampler 204 and the signal and data processors 208 to provide digital beamforming and general purpose computing to the radar system 104. The radar upgrade kit 102 also includes core processor 212, communication array 214, and memory 216 to support operation of the upgraded signal processing pipeline. By providing general purpose computing (e.g., by GPUs of the radar upgrade kit 102) to the radar system 104, the radar upgrade kit 102 can perform improved detection processing by applying one or more signal processing algorithms 208-1-208-N.

The radar system 104 includes the radar system software 242, which can control operations of the radar system and receive data from a battle manager 260, e.g., a remote device that provides mission profiles for the radar system software 242. The mission profiles can provide different missions, e.g., applications, for the radar system 104 to perform, in which the radar system software 242 can determine operations (e.g., transmitting beams, processing detections) to perform the provided applications. In some implementations, the radar system software 242 can include high-level programming, commands, and instructions to operate different subsystems of the radar, e.g., antenna array 106, radar transmitter 248, and so on. The radar system 104 also includes radar data storage 240 to store receive signals (e.g., RF returns) and detection data, which can be accessed by the radar system software 242 and provided to the radar upgrade kit 102 for additional processing, e.g., applying signal processing algorithms 208-1-208-N.

The radar system software 242 also provides output data (e.g., estimated trajectories of detected objects, classifications of the detected objects) for the battle manager 260, which can be provided to other radar systems and/or computing devices for further application. In some implementations, the output data is provided for display on a device. The radar system software 242 can also be coupled to a performance monitor 252, which monitors the performance of the radar system 104 that can be provided as a visualization, e.g., on a display. In some implementations, the performance monitor 252 provides differences in performance (e.g., improvements in object detection, tracking, and classification) for the radar system 104 upgraded by the radar upgrade kit 102.

The radar system software 242 can provide commands to a radar signal generator 244 that can also include waveform templates accessible to the radar system 104. These waveform templates can specify a transmit waveform, e.g., chirp waveform, with a corresponding amplitude and phase, that the radar signal generator 244 can generate and provide to receiver/exciter 246. The receiver/exciter 246 can provide the coherent frequency and timing for the transmit signal to be provided to each subarray array (e.g., subarrays 106-1-106-N) of antenna array 106. Prior to providing the phase shifted transmit signals to each subarray, the radar transmitter 248 utilizes a power amplifier, e.g., traveling wave tube (TWT) transmitters to drive antenna array 106 with the phase shifted transmit signals.

The radar upgrade kit 102 can be integrated with the pre-existing signal processing pipeline (e.g., radar signal generator 244, receiver/exciter 246, radar transmitter 248, and antenna 106) to leverage the upgraded signal processing pipeline to perform applications (e.g., obtained by the radar system software 242) for radar system 104. The radar upgrade kit 102 can be integrated into a pre-existing radar signal processing pipeline at a number of points, e.g., interfaces between components of the pre-existing signal processing pipeline. For example, the radar upgrade kit 102 can leverage signal and data processors 208 and high-speed samplers 204 to perform the applications of radar system 104. These applications can include searching for objects, generating tracks for detected objects, determining a class or type of detected object, as well as detecting and mitigating electromagnetic interference. The radar upgrade kit 102 is agnostic with respect to the radar system software 242, by enabling signal processing channels for respective receive signals from the antenna array 106, generating commands to control the antenna array 106, and providing transmit signals to the and the radar transmitter 248.

For example, the radar upgrade kit 102 can process receive signals from the antenna array 106, using high speed samplers 204, e.g., by A/D converters 204a to digitize the received RF signal into a digital signal for efficient signal processing. In some implementations, the received RF signals are sampled at high sampling rates (e.g., 2 GSPS) to achieve improved range accuracy (e.g., a tenth of a meter in range accuracy) for the detections of the received RF signals. By digitizing receive signals from the antenna array 106, the signal and data processors 208 can process the detections from the receive signals using the signal processing algorithms 208-1-208-N to generate output data.

As an example, the radar upgrade kit 102 can determine and provide uniquely chosen, phase-coded digitally generated waveforms as transmit signals to radar transmitter 248. In some implementations, these digitally generated waveforms are transmitted by antenna array 106 to detect an object, e.g., object 108, thereby resulting in phase-coded receive signals. The phase-coded receive signals can be combined, e.g., by superpositioning the phase-coded receive signals, to image the detected object. The image of the detected object can be generated as each phase-coded digitally generated waveform that is transmitted can interact (e.g., reflect, refract, scatter) with the detected object differently, e.g., capturing features of the detected object. These features can include the RCS, SNR, shape, length, etc. of the detected object.

In some implementations, the components of the pre-existing signal processing pipeline such as the radar system software 242, radar signal generator 244, and receive/exciter 246, are limited to a subset of waveforms, e.g., stored in radar data storage 240. The waveforms of the pre-existing radar signal processing pipeline for radar system 104 can be bandwidth limited, corresponding to poor range resolution and therefore lower likelihoods of detection and tracking of objects. These waveforms are often linear frequency modulated (LFM) waveforms, which are susceptible to electromagnetic interference due to the simplicity of their waveform design.

The radar upgrade kit 102 can provide additional waveform templates and provide transmitter control commands directly to the radar transmitter 248, or provide to the radar system software 242, which can then generate the transmitter control commands. As an example, the radar system software 242 can schedule a pulse for transmission to detect a type of object using a complex type of waveform, e.g., an arbitrary waveform with phase coding. The radar upgrade kit 102 can seamlessly provide the arbitrary waveform with synchronized timing to the radar system software 242, by loading the arbitrary waveform from the GPU to the D/A converters 204b and generate a D/A converted signal. The D/A converted signal is an analog output signal that can be injected into the radar transmitter 248 (e.g., instead of a legacy waveform from radar data storage 240), to be emitted by one or more subarrays of the antenna array 106. As another example, the radar upgrade kit 102 can determine commands to adjust one or more subarrays of the antenna array 106, e.g., by individually steering beams from each subarray and providing digital beamforming capabilities to the radar system 104.

In some implementations, the radar upgrade kit 102 provides transmitter control commands to the radar transmitter 248, e.g., to generate RF transmit signals for the antenna array 106 to illuminate potential targets using beams. The transmitter control commands can be generated by pre-processing generated waveforms (e.g., from waveform templates) from the signal and data processors 208, e.g., by FPGAs to pre-process the waveforms.

Following pre-processing of the generated waveforms, the radar upgrade kit 102 can provide the pre-processed generated waveforms to the high speed samplers 204 that convert the digital signal into an analog signal, e.g., by D/A converters 204b, for transmit by the antenna array 206. The transmitter control commands can indicate a power level to amplify transmit waveforms generated by the signal and data processors 208.

Figure 3:
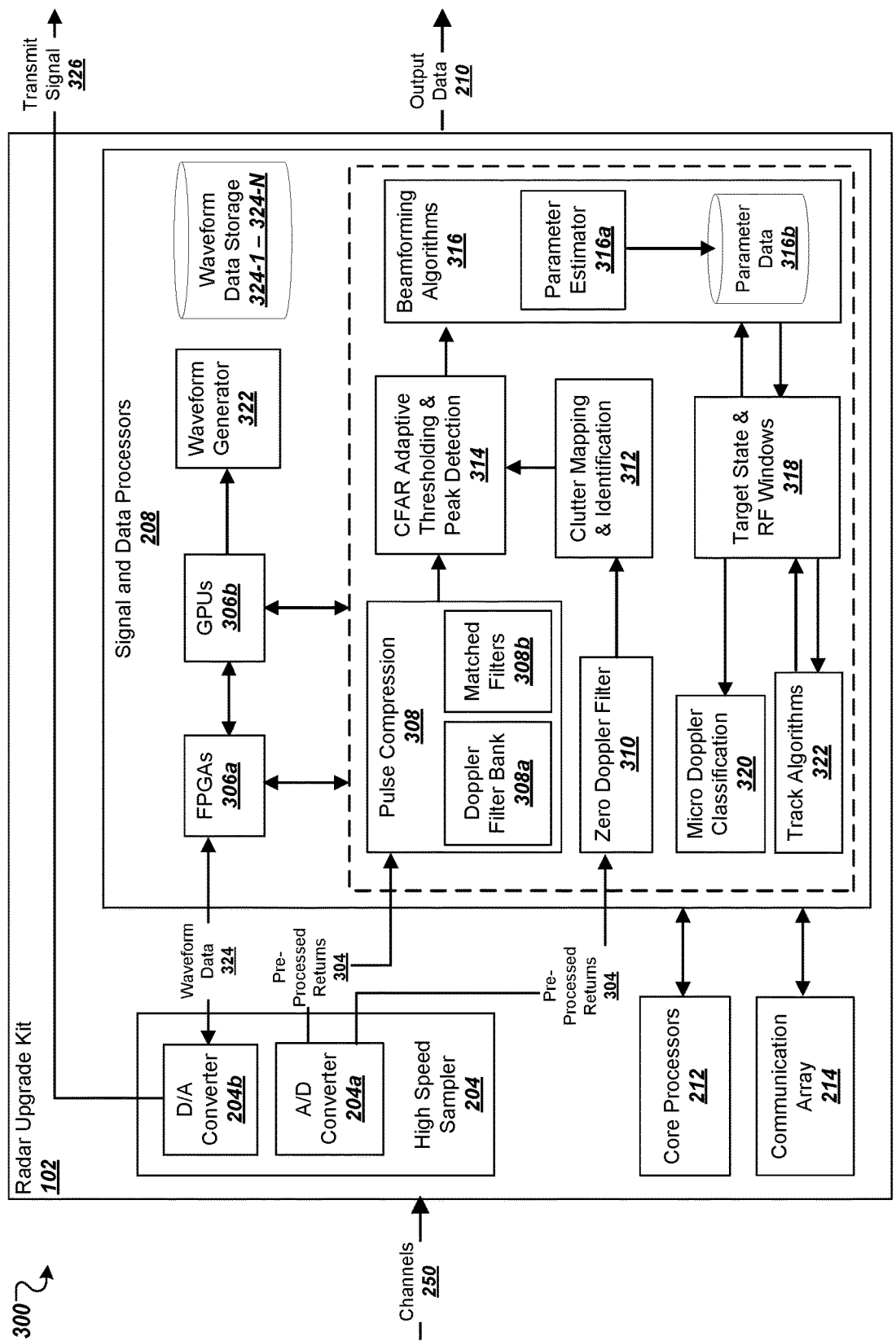
FIG. 3 illustrates an example of an upgraded signal processing pipeline of a radar upgrade kit.

FIG. 3 illustrates an example diagram 300 illustrating components (e.g., software and hardware) of the signal and data processors 208, as part of the upgraded signal processing pipeline provided by the radar upgrade kit 102. Software components of the signal and data processors 208 are illustrated in a dashed box, performed by hardware components such as FPGAs 306a and GPUs 306b. The high speed sampler 204 samples the receive signals from channels 250, e.g., from subarrays 106-1-106-N of antenna array 106. The signal and data processors 208 include hardware components such as field programmable gate arrays (FPGAs) 306a and graphics processing units (GPUs) 306b, as described in FIGS. 2A and 2B above.

The signal and data processors 208 include a waveform generator 322 that generates and stores waveforms in waveform data storage 324-1-324-N, e.g., when performing digital beamforming on transmit. The GPUs 306b can configure the waveform generator 322 to digitally generate different types of waveforms (e.g., phase coded waveforms, arbitrary waveforms) as transmit signals 326 for the pre-existing signal processing pipeline of the radar system 104, e.g., using transmit control commands for the radar transmitter 248 to provide to the antenna array 106 to generate and steer beams. For example, the signal and data processors 208 can use the processing resources from the GPUs 306b to digitally generate phase modulated waveforms (e.g., pulses) by generating waveform data 324, e.g., which can also be stored in waveform data storage 324-1-324-N. The waveform data 324 can be provided to the D/A converter 204b to generate an analog waveform in transmit signal 326 for the radar transmitter of a radar system, e.g., radar transmitter 248, referring to FIG. 2B above.

The signal and data processors 208 can also process received RF detections (e.g., returns) of a detected object, e.g., performing digital beamforming on receive. The received detections (e.g., antenna array 106) can be sampled by high-speed sampler 204 to generate pre-processed returns 304, e.g., which can be an example of sampled returns 206, referring to FIG. 2B above.

The high speed sampler 204 provides the pre-processed returns 304 to the signal and data processor 208 for additional processing that can be performed in parallel. In some implementations, the receive signals of channels 250 are sampled by the A/D converter 204a, in which the FPGAs 306a can digitally downconvert, interpolate, and filter RF detections to identify subsets of data for further processing performed by the signal and data processors 208. The pre-processed returns 304 can be processed in a first detection processing chain of the signal and data processors 208 that can include pulse compression 308, which utilizes a Doppler filter bank 306a and matched filters 308b to perform moving target detection of a detected object (e.g., object 108). The GPUs 306b of the signal and data processors 208 can perform pulse compression 308 of the pre-processed returns 304, to associate subsets of detections from the pre-processed returns 304 to the detected object, e.g., object 108. A Doppler filter in the Doppler filter bank 306a can be applied to the pre-processed returns 304 to indicate the magnitude of the Doppler frequency in the pre-processed returns 304, e.g., for monopulse processing.

In some implementations, the GPUs 306b performs pulse compression 308 of the pre-processed returns 304 using matched filters 308b, by correlating the pre-processed returns 304 with the transmit signal (e.g., phase-coded waveforms, utilized in digital beamforming techniques). The application of the Doppler filter in the Doppler filter bank 306a and/or a matched filter in matched filters 308b, can provide that the peak of the pre-processed returns 304 can be identified, e.g., corresponding to a detected object and its location. In some implementations, one or more GPUs 306b improve the pulse compression 308 of pre-processed returns 304 as multiple sets of pre-processed returns 304 can be processed simultaneously. One or more GPUs 306b (e.g., including all of the GPUs) can be tailored to perform pulse compression 308.

In parallel, the pre-processed return 304 can be processed in parallel by the GPUs 306b in a second detection processing chain, as the GPUs 306b apply zero Doppler filtering 310, then perform clutter mapping and identification 312. For example, the GPUs 306b apply the zero Doppler filter 310 to filter out pre-processed returns 304 with a threshold Doppler frequency (e.g., cutoff-frequency) and determine the subset of pre-processed returns 304 within the threshold Doppler frequency, e.g., pre-processed returns 304 associated with clutter. The GPUs 306b can perform clutter mapping and identification 312 to map clutter, by identifying locations of the clutter from various sources. The determined subset of pre-processed returns 304 from the zero Doppler filter are associated as potential sources of clutter, and the algorithms (e.g., clutter mapping and identification 312) performed by the GPUs 306b identify locations of the potential sources of clutter. The GPUs 306b can perform clutter mapping and identification 312 across multiple subsets or sets of pre-processed returns 304, achieving computational savings and improved computational efficiency compared to leveraging the pre-existing signal processing pipeline of the radar system 104.

The GPUs 306b perform CFAR adaptive thresholding and peak detection 314 (e.g., an example of algorithms 208-1-208-N) to determine a probability of detection and a probability of false alarm for each detection in the pre-processed returns. A subset of the GPUs 306b can be dedicated, e.g., tailored, to perform CFAR adaptive thresholding and peak detection 314, to determine appropriate threshold values and categorize detections. By dedicating some or all of the GPUs 306b, an accurate threshold for CFAR can be effectively determined and leveraged by signal and data processors 308 when estimating trajectories of detected objects. Improved CFAR thresholding provided by the GPUs 306b provide that small targets (e.g., low values of RCS, SNR) can be detected and their trajectories estimated with higher probabilistic likelihoods, e.g., compared to processing performed by the pre-existing signal processing pipeline of the radar system 104.

The GPUs 306b can also perform a number of beamforming algorithms 316 such as maximum likelihood estimation, least mean squares, recursive least squares, etc. The GPUs can perform the beamforming algorithms 316 to estimate angle of arrival of the detected objects of the pre-processed returns 304, estimating and adjusting parameters for the beamforming algorithms 316 by a parameter estimator 316, which stores the results in parameter data 316b. In some implementations, the beamforming algorithms 316 includes multiple signal classifications of the returns to estimate direction of arrival. Furthermore, the GPUs 306b can perform the beamforming algorithms 316 with improved RF signal envelope matching, e.g., tailoring a set or subset of the GPUs 306b to identify combinations of parameters with best estimations (e.g., low error) in angles (e.g., azimuth, elevation) of the detected object. The GPUs 306b can thereby provide improved position accuracy of a detected object, leveraging the additional processing capabilities for the beamforming algorithms 316.

The GPUs 306b can also perform algorithms to determine target state and RF windows 318, which can be leveraged for micro Doppler classification 320 and track algorithms 322. The GPUs can use one or more models to perform track algorithms 322, using the target state and RF windows 318 to provide measurements of the target's state, e.g., position, velocity, and so on. For example, some or all of the GPUs 306b can be tailored to determine states (e.g., position, velocity, and acceleration in Cartesian coordinates) of detected objects, e.g., targets. The track algorithms 322 can include any estimation algorithm, e.g., a Kalman Filter, to estimate a trajectory of the detected object. The GPUs 306b can also perform micro Doppler classification 320 to determine vibrations and rotations of detected objects, e.g., based on how the vibrations and rotations induce additional frequency modulations on the receive signals of the detected object.

The signal and data processor 208 can generate results of any of the algorithms performed (e.g., pulse compression 308, beamforming algorithms 316, track algorithms 322), and provide results as output data 210. The output data 210 (as described in FIG. 2 above) can be provided to the radar system 104 (e.g., as well as battle manager 250).

Figure 4:
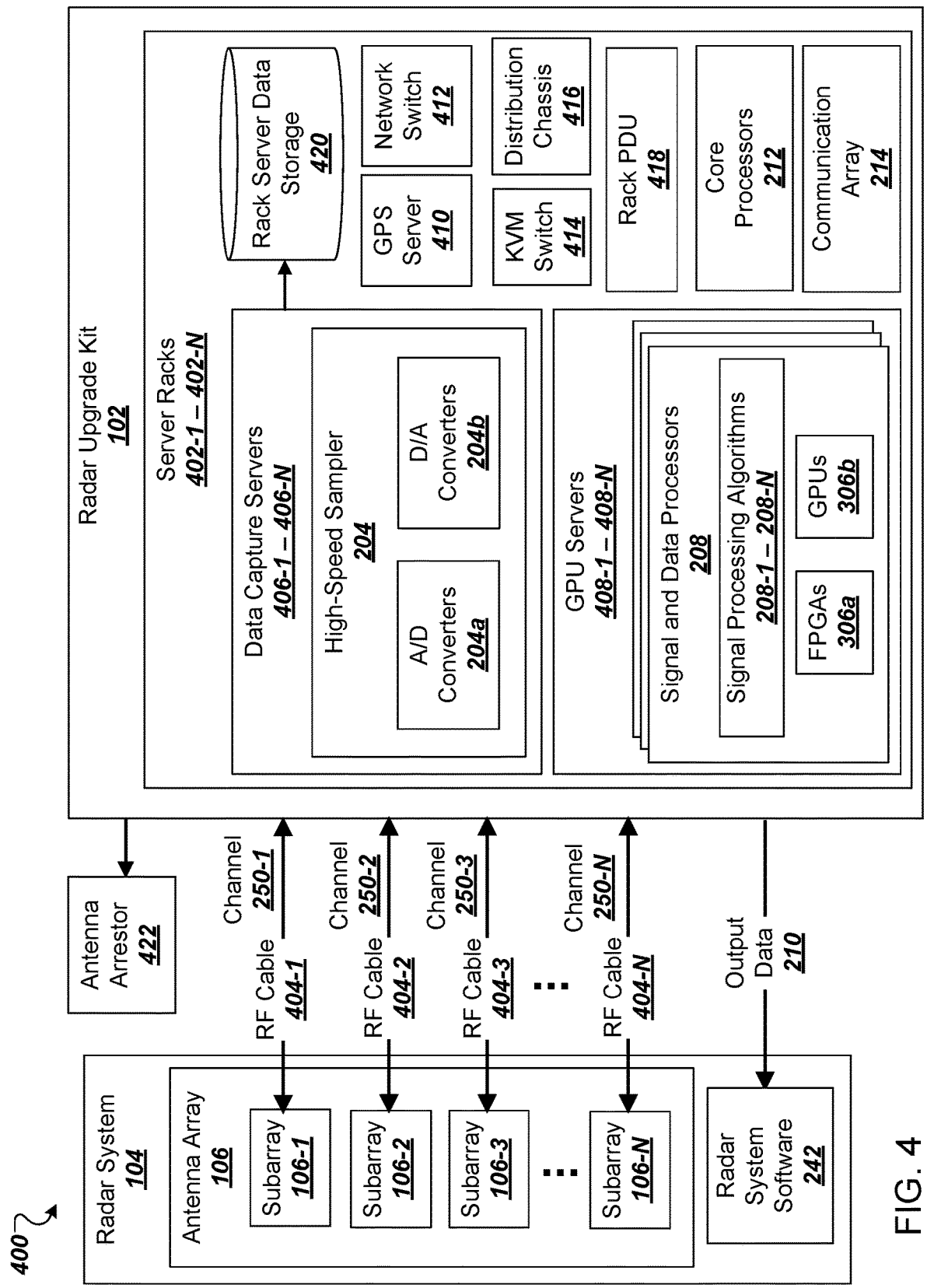
FIG. 4 illustrates an example implementation of a radar upgrade kit.

FIG. 4 illustrates an example implementation 400 of a radar upgrade kit 102 to upgrade the pre-existing signal processing pipeline of radar system 104 by establishing multiple channels. The channels 250-1-250-N can be established by connecting respective RF cables 404-1-404-N to the corresponding subarrays 106-1-106-N of the antenna array 106 of the radar system 104. The RF cables 404-1-404-N can be a coaxial cable with resistance of 50 ohms and an overall diameter of 7.62 millimeters. The RF cables 404-1-404-N provide flexibility, power handling, and attenuation to enable signal transmissions between the radar system 104 and radar upgrade kit 102.

The radar upgrade kit 102 includes server racks 402-1-404-N that each contain hardware and software components of the upgraded signal processing pipeline. The hardware components of the server racks 402-1-402-N are modular, e.g., can be inserted or removed from respective housings for the component. The software for performing applications of the radar upgrade kit 102 can be performed by servers, such as data capture servers 406-1-406-N and GPU servers 408-1-408-N. The data capture servers 406-1-406-N can include the high-speed sampler 204 with A/D converters 204a and D/A converters 204b to sample the channels 250-1-250-N and process received RF signals of the antenna array 106. The data capture servers 406-1-406-N can read data from the channels 250-1-250-N and write data to memory storage, e.g., rack server data storage 420. The GPU servers 408-1-408-N can contain the signal and data processors 208, FPGAs 306a, and GPUs 306b. The GPU servers 408-1-408-N also include signal processing algorithms 208-1-208-N performed by the signal and data processors 208, e.g., through processes and computations performed by FPGAs 306a and GPUs 306b, respectively. The rack cabinets 402-1-402-N can each include core processors 212 and communication array 214. In some implementations, the radar upgrade kit 102 can be coupled to an antenna arrestor 422 that diverts surges in electrical power to protect components of the radar upgrade kit 102, such as servers, cables, switches, etc.

The server racks 402-1-402-N includes additional devices such as GPS server 410, network switch 412, KVM switch 414, distribution chassis 416, and rack PDU 416. The GPS server 410 can provide high-precision timing and location data for the radar upgrade kit 102 to synchronize signals, e.g., transmitted and/or received through channels 250-1-250-N. Each of the server racks 402-1-402 can include a respective network switch 412 to handle data transmission between components of the radar upgrade kit 102, such as sampled RF returns between the data capture servers 406-1-406-N and the GPU servers 408-1-408-N. The KVM switch 414 provides a console that can include a display, e.g., a monitor, and mechanism for user input, e.g., a keyboard and/or mouse. In some implementations, the KVM switch 414 can provide a user interface to configure the server racks 402-1-402-N, thereby configuring the radar upgrade kit 102 and adjust operation based on input.

As an example, the radar upgrade kit 102 can be configured to process a subset of channels corresponding to a subset of the subarrays from the antenna array 106 of the radar system 106. In some implementations, the radar upgrade kit 102 can be configured by the KVM switch 414 to control operations of one or more servers, e.g., data capture servers 406-1-406-N, GPU servers 408-1-408-N, and/or GPS server 410. The KVM switch 414 can provide efficient switching operations between different servers configured for the server racks 402-1-402-N. In some implementations, the KVM 414 can be configured to include network security, e.g., providing firewalls against cyber attacks from a wireless connection.

The server racks 402-1-402-N can also include rack power distribution units (PDU) 418, which provides electrical connection and protection to the components of the server racks 402-1-402-N. The server racks 402-1-402-N can be configured by the distribution chassis 416 to distribute synchronized timing signals across the server racks 402-1-402-N to enable timing synchronization for the radar upgrade kit 102. For example, the samples obtained by data capture servers 406-1-406-N can be synchronized to respective timing signals from the distribution chassis 416 across multiple server racks 402-1-402-N. The signal and data processor 208 of the GPU servers 408-1-408-N can also leverage synchronization of transmit/receive signals from respective signal processing algorithms 208-1-208-N.

Figure 5:
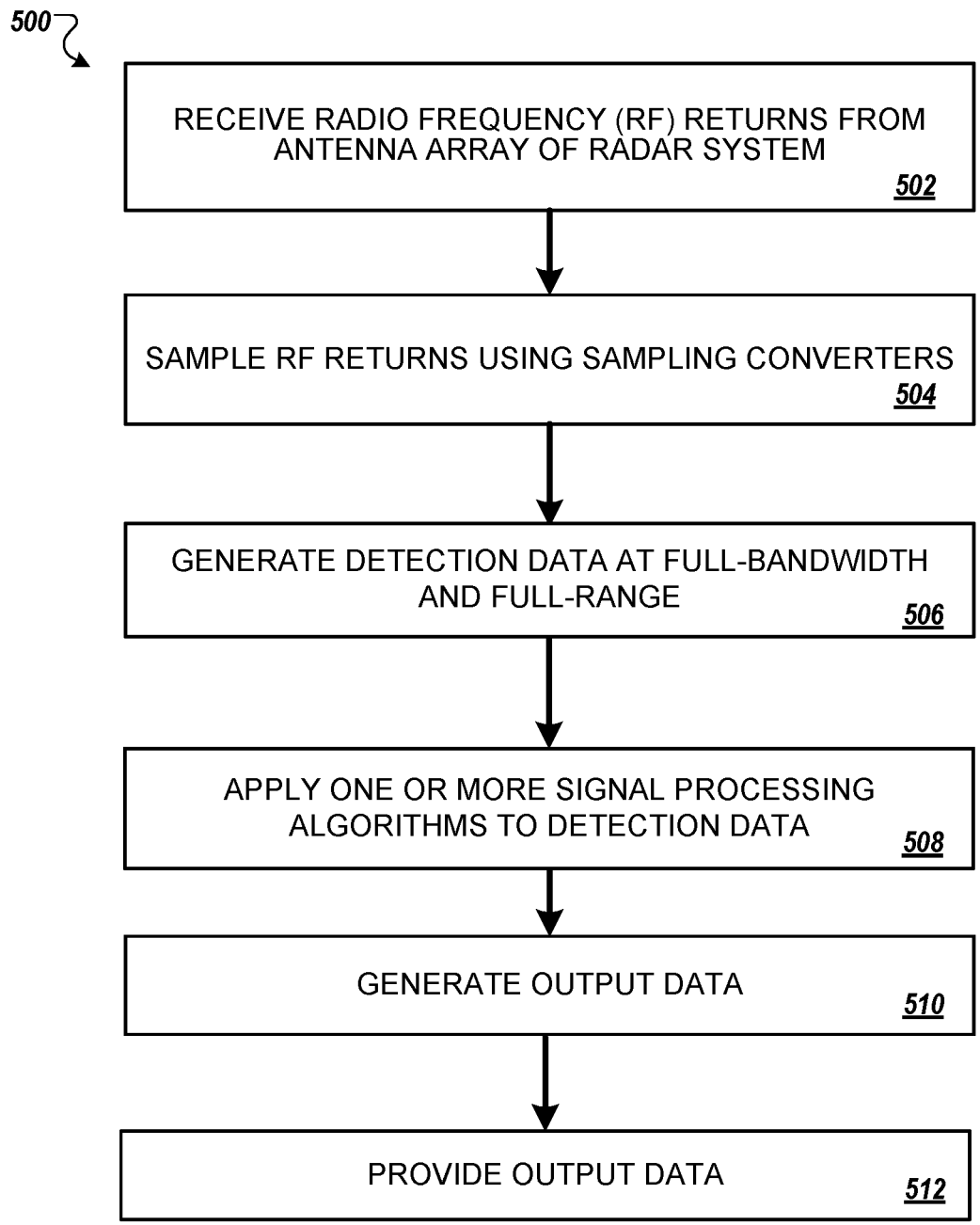
FIG. 5 illustrates an example process performed by a radar system upgrade kit.

FIG. 5 illustrates an example process 500 performed by a radar system upgrade kit. Briefly, the process 500 includes the radar system upgrade kit receiving RF returns from the antenna array of the radar system (502), sampling the RF returns using high-speed sampling converters (504), generating detection data at range resolutions corresponding to full-bandwidth and full-range (506), applying one or more signal processing algorithms to detection data (508), generating the output data (510), and providing the output data (512).

The process 500 includes the step of the radar system upgrade kit receiving RF returns from the antenna array of the radar system (502). The radar system upgrade kit receives returns from detection objects of the antenna array of the radar system. An example of a detected object can include a hypersonic glide vehicle, drone, missile, aircraft, weather precipitation, among other objects. In some implementations, the RF returns can result from one or more beams generated by the antenna array of the radar system. In some implementations, the beams generated by the antenna array of the radar system can be digitally generated by the radar system upgrade kit, e.g., to provide arbitrary waveforms for transmit.

The process 500 includes the step of the radar system upgrade kit sampling the RF returns using high-speed sampling converters (504). The radar system upgrade kit can include analog-to-digital converters to digitize the obtained radio frequency returns, e.g., sampling the returns at high sampling rates to achieve high resolution data, e.g., at full-range, resolution, bandwidth of the range window.

The process 500 includes the step of the radar system upgrade kit generating detection data at range resolutions corresponding to full-bandwidth and full-range (506). The high resolution data provided by the radar system upgrade kit can be further processed to generate detections at improved range resolutions, throughout the entirety of the range window of the radar system. The detection data generated includes higher resolution due to the large number of samples provided by the high speed samplers.

The process 500 includes the step of the radar system upgrade kit applying one or more signal processing algorithms to detection data (508). The signal processing algorithms from the upgraded signal processing pipeline of the radar system upgrade kit can include algorithms to determine target state and RF windows for detection objects. The algorithms can also include adaptive threshold and peak detection for false alarm detection, e.g., determining likelihoods of detections associated with a particular object. The radar system upgrade kit serves as an intermediary layer between the acquisition of RF detections, e.g., the antenna array of the pre-existing signal processing system, and the upgraded signal processing backend, e.g., hardware and software components of the radar system upgrade kit. By doing so, the signal processing algorithms can be effectively and agnostically applied to detections, irrespective of interfaces between components of the existing radar hardware and software of the radar system.

The process 500 includes the step of the radar system upgrade kit generating the output data (510), and providing the output data (512). The output data, e.g., output data 210, can include improved measurements and estimations for object trajectories. In some implementations, the output data can include measurements with improved clutter rejection that accounts for diffraction and dispersion. Furthermore, the additional processing resources and tensor-based computations of the GPUs enable additional capabilities to the radar system, e.g., through the radar system upgrade kit, including digital beamforming, electronic protection, transmit beam spoiling, among many complex algorithms enabled by the upgraded signal processing pipeline.

Figure 6:
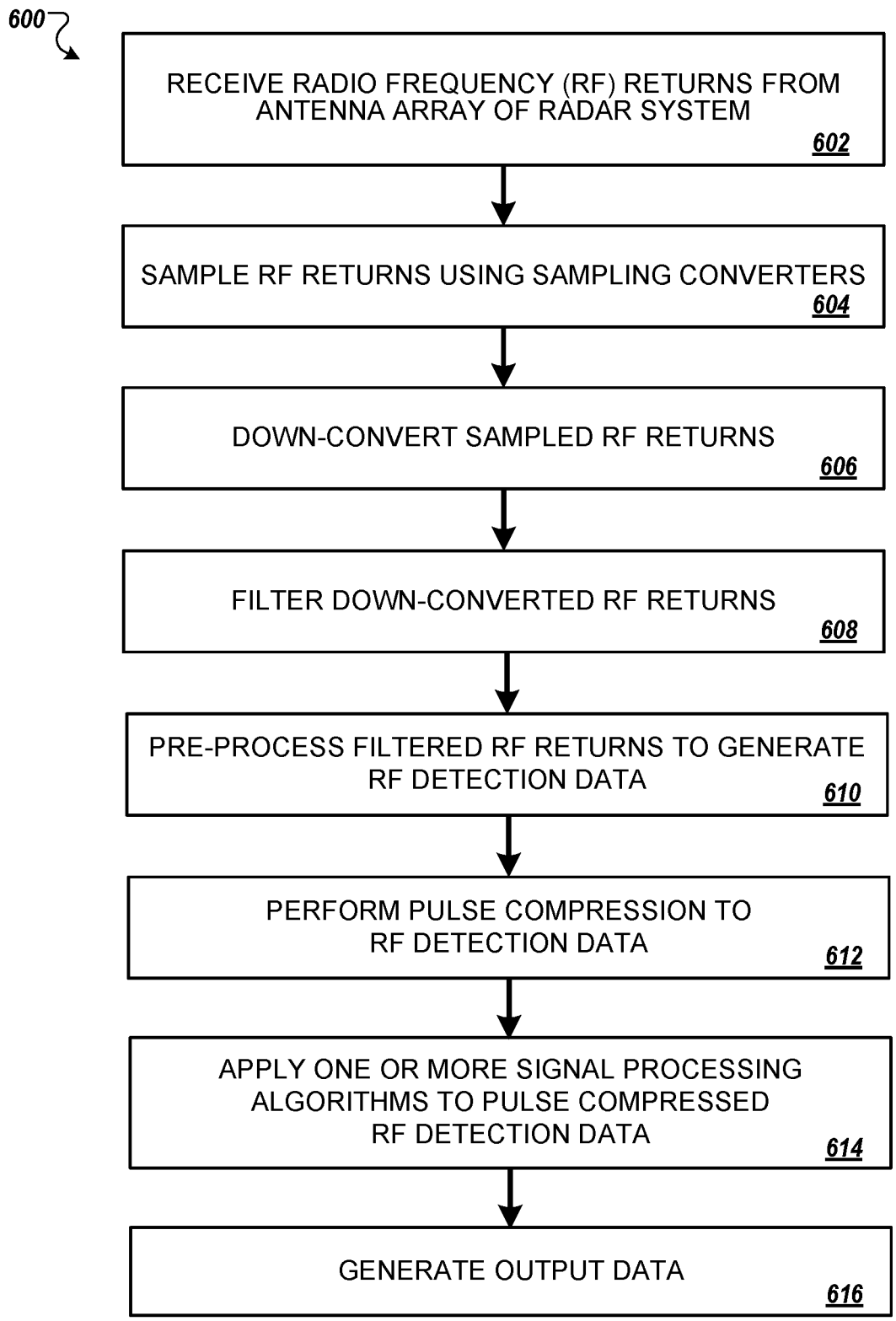
FIG. 6 illustrates an example digital beamforming process performed by a radar system upgrade kit.

FIG. 6 illustrates an example digital beamforming process 600 performed by a radar system upgrade kit. Briefly, the process 600 includes the radar system upgrade kit receiving RF returns from the antenna array of the radar system (602), sampling the RF returns using high-speed sampling converters (604), down-converting sampled RF returns (606), filtering the down-converted RF returns (608), pre-processing the filtered RF returns to generate RF detection data (610), performing pulse compression techniques to the RF detection data (612), applying one or more signal processing algorithms to the pulse compressed RF detection data (614), and generating the output data (616).

The process 600 includes the step of the radar system upgrade kit receiving RF returns from the antenna array of the radar system (602). The radar system upgrade kit can include radio frequency cables to establish channels for receiving and transmitting radar signals between the radar system and the signal processing backend, e.g., server racks that include GPU servers and data capture servers of the radar system upgrade kit. The RF cables can establish any number of channels to connect the radar system upgrade kit to the radar system.

The process 600 includes the step of the radar system upgrade kit sampling the RF returns using high-speed sampling converters (604). In some implementations, the radar system upgrade kit can include digital-to-analog converters to generate analog transmit signals from digitally generated waveforms generated by the upgraded signal processing pipeline of the radar system upgrade kit. The analog transmit signals representing the digital waveforms can be provided to the antenna array of the radar system, e.g., to illuminate a cluster of beams onto regions of space monitored by the antenna array. The positioning of radar search beams can provide detectability of objects, e.g., by estimating position, velocity, acceleration of the object. In some implementations, a single transmit beam can be emitted with energy spread over a large volume in space, e.g., to increase coverage from the antenna array and increase the likelihood of acquiring detections from objects.

The process 600 includes the step of the radar system upgrade kit down-converting sampled RF returns (606). For example, the FPGAs of the radar system upgrade kit can preserve detection data of the RF returns obtained by the antenna array at first frequency, by down-converting the RF returns to a second frequency that is lower than the first frequency. The radar system upgrade kit can digitally down convert RF returns to the second frequency, which can be a frequency of interest, e.g., a subset of the bandwidth provided by the antenna array. The radar system upgrade kit can provide relevant detection data the second frequency, e.g., the frequency of interest for detected objects, and discard RF returns from the high speed sampling converters that are outside of the frequency of interest.

The process 600 includes the step of the radar system upgrade kit filtering the down-converted RF returns (608). The FPGAs of the radar system upgrade kit can filter down-converted RF returns to increase the dynamic range of the detections, e.g., ratios between smallest and largest values of radar data such as RCS, SNR, and so on. The filtering process performed on the down-converted RF returns can also provide benefits in removing electromagnetic interference, by removing returns at frequencies associated with electromagnetic interference, e.g., particular frequency bands of the radar system that are affected by the interference.

The process 600 includes the step of the radar system upgrade kit pre-processing the filtered RF returns to generate RF detection data (610). The pre-processing can include any number of operations performed by the GPUs, the FPGAs, or both. In some implementations, the pre-processing can include interpolating the filtered RF returns to a bandwidth that matches the transmit signal provided by the antenna array, e.g., increasing the SNR of the detected object.

The process 600 includes the step of the radar system upgrade kit performing pulse compression techniques to the RF detection data (612). The GPUs of the radar system upgrade kit can detect objects using chirp transmit waveforms (e.g., linear frequency modulated waveform) and compress the energy of the received signal corresponding to the chirp transmit waveforms into a shorter time window, e.g., compared to signal processing techniques that do not include pulse compression. The compression of energy into shorter time windows can increase range resolution and SNR of the detected object captured in the RF detection data.

The process 600 includes the step of the radar system upgrade kit applying one or more signal processing algorithms to the pulse compressed RF detection data (614). The GPUs of the radar system upgrade kit can apply any number of algorithms by leveraging dynamically adaptable tensor cores to perform numerous calculations, e.g., trillions of floating point operations per second. In some implementations, a subset of GPUs can be configured to particular applications associated with a type of radar application, e.g., provisioning computing resources to perform highly complex and/or specialized computations associated with the type of radar function. The radar applications can include searching (e.g., placing beams in scannable regions of the antenna array) for objects in the field of the antenna array, detecting and estimating object trajectories, identifying types of objects, as well as detecting and removing electromagnetic interference in RF returns of detected objects.

The process 600 includes the step of the radar system upgrade kit generating the output data (616). The output data can include prioritization of tracking objects based on the type of object detecting, e.g., by classifying objects through the one or more algorithms performed by the GPUs.

In conclusion, these techniques described herein can provide numerous advantages to radar systems upgraded by the radar system upgrade kit. The modular components of the radar system upgrade kit, e.g., GPUs, FPGAs, high speed sampling converters, and customizable computing, can provide the advantages of the radar system upgrade kit to a radar system by connecting the RF cables of the radar system upgrade kit to the radar system, e.g., through hardware such as the antenna array, the preexisting signal processing pipeline, and so on. The modular components can provide further customization and upgradeability of radar systems, thereby extending life cycles of radar systems and improving and/or adding radar capabilities to radar systems. The capabilities can include electromagnetic interference mitigation, digital beamforming, complex tracking and object detection algorithms, radar resource prioritization, etc. Furthermore, the tensor-cores of the GPUs and configurability of the FPGAs enable multiple types of signal processing techniques to be performed by the radar system upgrade kit, which can provide the outputs of signal processing techniques to the radar system and/or one or more external computing devices, e.g., a battle manager, a command and control center.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
    an antenna subsystem having a preexisting processing pipeline, configured to receive radio frequency returns; and
    an upgraded signal processing pipeline coupled to the preexisting processing pipeline, wherein the upgraded signal processing pipeline is configured to perform detection processing for the antenna subsystem and comprises:
        a plurality of sampling converters that are configured to directly sample the radio frequency returns of the antenna subsystem;
        a plurality of field-programmable gate array devices that are configured to generate detection data of the radio frequency returns at full-bandwidth and full-range of the antenna subsystem;
        a plurality of graphics processing units that are configured to apply one or more algorithms to the detection data of the radio frequency returns; and
        a signal processor configured to perform operations on the sampled radio frequency returns, wherein the operations comprise:
            sampling, by the plurality of sampling converters, the radio frequency returns of the antenna subsystem;
            generating, by the plurality of field-programmable gate array devices, detection data representing the sampled radio frequency returns within full-bandwidth and full-range of the antenna subsystem;
            applying, by the plurality of graphics processing units, one or more algorithms to the detection data to determine output data for the preexisting processing pipeline of the antenna subsystem; and
            providing the output data to the preexisting processing pipeline of the antenna subsystem.

2. The system of claim 1, wherein the preexisting processing pipeline of the antenna subsystem further comprises radar control software, and the upgraded radar signal processing pipeline is further configured to provide the output data to the radar control software of the antenna subsystem.

3. The system of claim 1, wherein the plurality of sampling converters comprises analog-to-digital converters (ADC) configured to generate samples of the radio frequency returns, the samples comprising digital representations of the radio frequency returns of the antenna subsystem.

4. The system of claim 1, wherein the output data comprises data related to one or more detected objects of the radar system.

5. The system of claim 4, wherein the data related to the one or more detected objects further comprises at least one of (i) values related to an object of the one or more detected objects (ii) labels related to an object of the one or more detected objects.

6. The system of claim 1, wherein the one or more algorithms comprises performing at least one (i) adaptive thresholding, (ii) matched filtering, (iii) digital calibration, (iv) angle of arrival estimation, or (v) maximum likelihood estimation, based on the detection data.

7. The system of claim 1, comprising a transmitter amplifier subsystem coupled to antenna subsystem, wherein a control subsystem of the upgraded signal processing pipeline is configured to provide the output signals for digital waveforms to the transmitter amplifier.

8. The system of claim 7, wherein the plurality of sampling converters comprises digital-to-analog converters (DAC) configured to convert the output signals from a digital waveform into an analog waveform for transmission by the transmitter amplifier subsystem.

9. The system of claim 1, wherein the plurality of graphics processing units are configured to apply at least one pulse compression technique of one or more pulses corresponding to the detection data.

10. The system of claim 1, wherein each of the plurality of sampling converters are high-speed sampling converters configured to obtain at least a rate of 10 giga samples per second.

11. The system of claim 1, wherein the system further comprises a control subsystem configured to provide output signals to the antenna subsystem, the output signals including digital waveforms for the antenna subsystem to generate and transmit beams corresponding to the digital waveforms.

12. The system of claim 1, wherein the plurality of graphics processing units are configured to process the detection data from the radio frequency returns from within a range window of one or more received signals corresponding to the radio frequency returns of the antenna subsystem.

13. The system of claim 12, wherein the plurality of graphics processing units are further configured to synchronize timing data related to the one or more received signals.

14. A system comprising:
an antenna subsystem having a preexisting processing pipeline, configured to receive radio frequency returns;
an upgraded signal processing pipeline coupled to the preexisting processing pipeline, wherein the upgraded signal processing pipeline is configured to perform detection processing for the antenna subsystem and comprises:
a plurality of sampling converters that are configured to directly sample the radio frequency returns of the antenna subsystem;
a plurality of field-programmable gate array devices that are configured to generate detection data of the radio frequency returns at full-bandwidth and full-range of the antenna subsystem;
a plurality of graphics processing units that are configured to apply one or more algorithms to the detection data of the radio frequency returns; and
a signal processor configured to perform operations on the sampled radio frequency returns, wherein the operations comprise:
sampling, by the plurality of sampling converters, the radio frequency returns of the antenna subsystem;
down-converting, by the plurality of field-programmable gate array devices, the sampled radio frequency detections;
filtering, by the plurality of field-programmable gate array devices, the down-converted sampled radio frequency detections;
pre-processing the filtered down-converted sampled radio frequency returns to generate digitized radio frequency returns;
applying, by the plurality of graphics processing units, one or more algorithms to the detection data to determine output data for the preexisting processing pipeline of the antenna subsystem; and
providing the output data to the preexisting processing pipeline of the antenna subsystem.

15. The system of claim 14, wherein the system further comprises a control subsystem configured to provide output signals to the antenna subsystem, the output signals including digital waveforms for the antenna subsystem to generate and transmit beams corresponding to the digital waveforms.

16. The system of claim 15, wherein the digital waveforms further comprise one or more phase weightings corresponding to each subarray of the antenna subsystem, the one or more phase weightings being determined by the signal processor.

17. The system of claim 15, wherein the control subsystem is further configured to generate multiple receive beams for a respective transmit beam, the transmit beam corresponding to one or more of the digital waveforms.

18. The system of claim 15, wherein the digital waveforms comprises phase-coded waveforms that enable the antenna subsystem to perform radar imaging of objects, wherein each phase-coded waveform comprises a unique antenna pattern for the antenna subsystem.

19. The system of claim 18, wherein in response to receiving multiple phase-coded beams, the signal processor is configured to generate a radar image of an object using the one or more algorithms of the plurality of graphics processing units.

20. The system of claim 14, wherein the signal processor is further configured to perform operations comprising:
identify, by the one or more algorithms of the plurality of graphics processing units, one or more detections of the detection data indicating electromagnetic interference;
removing, by the one or more algorithms of the plurality of graphics processing units, the one or more detections from the detection data indicating electromagnetic interference; and
providing remaining detections from the detection data as the output data for the preexisting processing pipeline of the antenna subsystem.

21. The system of claim 14, wherein down-converting the sampled radio frequency detections comprises generating detection data for the sampled radio frequency detections at a second frequency lower than a first frequency of the sampled radio frequency detections.

22. The system of claim 14, wherein filtering the down-converted sampled radio frequency detections comprises removing a subset of the detection data for the down-converted sampled radio frequency detections below a threshold value.

23. The system of claim 22, wherein the threshold value is one or more of (i) a value for signal-to-noise ratio, (ii) a value for radar cross section, or (iii) a value indicating likelihood that a radio frequency detection includes electromagnetic interference.

24. The system of claim 14, wherein pre-processing the filtered down-converted sampled radio frequency returns to generate digitized radio frequency returns comprises interpolating the filtered down-converted sampled radio returns from a first bandwidth of the sampled radio frequency detections to a second bandwidth of a transmit beam that resulted in one or more of the radio frequency detections.

25. A rack of a radar upgrade system, the rack comprising:
a plurality of radio frequency cables configured to connect to an antenna subsystem comprising a pre-existing signal processing pipeline from an upgraded signal processing pipeline of the radar upgrade system, the plurality of radio frequency cables establishing one or more receive channels for the antenna subsystem;

one or more data capture servers configured to sample data from the one or more receive channels of the antenna subsystem;

one or more graphical processing unit servers comprising a signal processor, a plurality of graphical processing units, and a plurality of field-programmable gate array devices, the one or more graphical processing servers configured to generate output data based on the data from the receive channels of the antenna subsystem; and a global positioning system server, configured to provide synchronization data to a distribution chassis, the distribution chassis configured to synchronize signals between servers of the rack to one or more additional racks of the radar upgrade system.

* * * * *